United States Patent
Powell et al.

(10) Patent No.: US 6,311,926 B1
(45) Date of Patent: Nov. 6, 2001

(54) SPACE TRAM

(76) Inventors: James R. Powell, P.O. Box 547, Shoreham, NY (US) 11786; George Maise, 180 Harbor Rd., Stony Brook, NY (US) 11790

( * ) Notice: Subject to any disclaimer, the term of this patent is extended or adjusted under 35 U.S.C. 154(b) by 0 days.

(21) Appl. No.: 09/558,423

(22) Filed: Apr. 25, 2000

Related U.S. Application Data

(60) Provisional application No. 60/132,444, filed on May 4, 1999.

(51) Int. Cl.[7] ................................................. B64F 1/04
(52) U.S. Cl. ............................................. 244/63; 104/123
(58) Field of Search ................................. 244/158 R, 63, 244/1 R, 137.1, 172; 104/123, 124

(56) References Cited

U.S. PATENT DOCUMENTS

| | | | |
|---|---|---|---|
| 2,485,601 | * 10/1949 | Hickman | 244/63 |
| 3,470,828 | 10/1969 | Powell et al. | |
| 3,589,300 | * 6/1971 | Wip | 244/63 |
| 4,775,120 | * 10/1988 | Marwick | 244/63 |
| 4,881,446 | * 11/1989 | Marks et al. | 244/63 |
| 4,909,458 | * 3/1990 | Martin | 244/63 |
| 5,024,137 | * 6/1991 | Schroeder | 244/63 |

OTHER PUBLICATIONS

Mankins, "The MagLifer: An Advanced Concept Using Electromagnetic Propulsion in Reducing the Cost of Space Launch," AIAA 94–2726, 38th Joint Propulsion Conf. and Exhibit, Indianapolis, IN, Jun. 24–29, 1994, pp; 1–17.

Moss, "Use of Superconductor Cable to Levitate an Earth Tethered Platform," J. Aero. Sci., vol. 37, No. 4, 10–12 1989, pp: 465–476.

* cited by examiner

Primary Examiner—Charles T. Jordan
Assistant Examiner—Tien Dinh
(74) Attorney, Agent, or Firm—Francis L. Conte

(57) ABSTRACT

A spacecraft may be launched into outer space around the earth by magnetically suspending a sky tube having an inlet on earth and an outlet at altitude. The sky tube is evacuated, and the spacecraft is propelled therethrough to achieve escape velocity for reaching outer space.

19 Claims, 13 Drawing Sheets

SPACE TRAM

This application claims the benefit of U.S. Provisional Application No. 60/132,444, filed May 4, 1999.

BACKGROUND OF THE INVENTION

The present invention relates generally to space technology, and, more specifically, to launching spacecraft into earth orbit.

Since the dawn of the space age spacecraft have been launched into outer space in orbit around the earth using rocket propulsion. The majority of weight of the spacecraft is found in the main rocket motor(s) and the required fuel and oxidizer therefor, leaving little weight for the remaining spacecraft itself which reaches earth's orbit. Spacecraft may either be manned or unmanned, and in either case may be used for placing payloads, such as satellites, for example, in earth's orbit.

The cost to launch payloads into outer space around the earth is about $10,000 per kilogram in Low Earth Orbit (LEO). The cost for Geosynchronous Earth Orbit (GEO) and planetary exploration is much greater. Paradoxically, the energy cost to reach space is very small for objects directly accelerated to orbital velocities. The energy to place a kilogram in LEO then costs only 50 cents at 5 cents per kilowatt hour, a factor of about 10,000 smaller than the present cost with rockets.

This high cost results from the inherent limitations of rockets, with their payload fraction being only about 1%, and they are complex and very expensive for both expendable and reusable versions, such as the shuttle. The development of improved reusable single stage to orbit (SSTO) spacecraft, or high Mach air breathing space planes (NASP), could cut launch costs somewhat, but they still will be high, about $1000/kg or more.

Accordingly, it is desired to provide an improved method and apparatus for launching spacecraft into outer space, including earth's orbit, eliminating or reducing the need for rocket propulsion.

BRIEF SUMMARY OF THE INVENTION

A spacecraft may be launched into outer space around the earth by magnetically suspending a sky tube having an inlet on earth and an outlet at altitude. The sky tube is evacuated, and the spacecraft is propelled therethrough to achieve escape velocity for reaching outer space.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
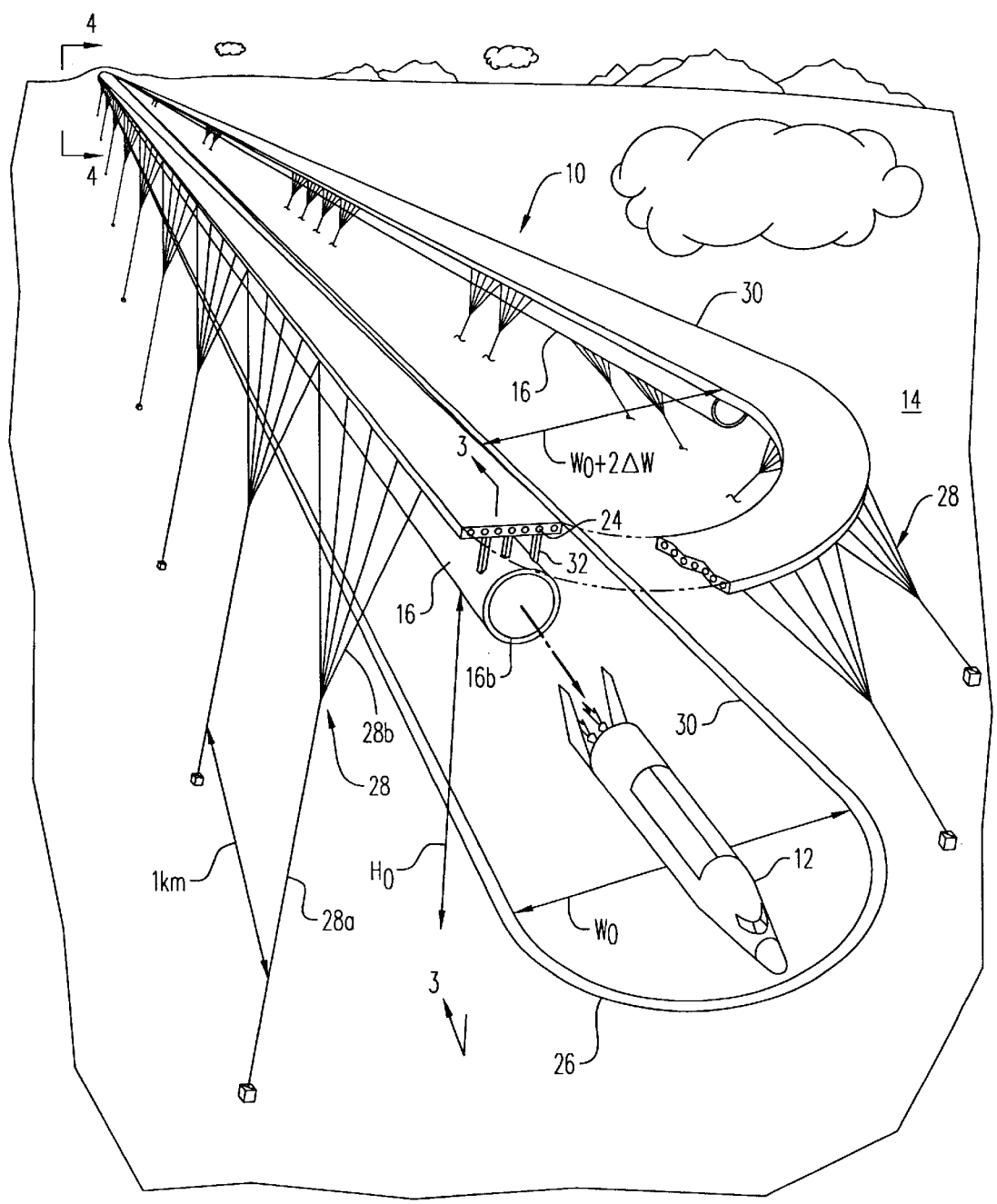
FIG. 1 is a schematic representation of a StarTram system according to a preferred embodiment, including a magnetically suspended sky tube for launching a spacecraft into earth orbit.

Illustrated schematically in FIG. 1 is a system 10 for effecting an improved method for launching a spacecraft or vehicle 12 from earth 14 into outer space around the earth beyond earth's normal atmosphere, such as in orbit therearound. The system 10 is referred to as StarTram or SpaceTram for its ability to relatively inexpensively launch payloads of cargo into or beyond earth orbit as desired with little or no need for rocket propulsion.

A levitated tube or sky tube 16 is magnetically suspended from the earth and evacuated for reducing air resistance therein for the spacecraft propelled therethrough. The spacecraft is propelled from the earth's surface and to suitably high altitude for achieving escape velocity to reach outer space.

StarTram is a new concept for launching heavy payloads into orbit at much lower cost and much greater volume than now possible. Spacecraft are magnetically suspended and accelerated to orbital velocity, about 8 km/s, in a long evacuated tunnel at ground level. They then coast upwards inside the magnetically levitated evacuated launch tube 16 to high altitude, e.g., 22 km, where they enter the atmosphere. The low ambient air density, about 5% of that at sea level, greatly reduces air drag and heating, and enables spacecraft to reach Low Earth Orbit (LEO) without damage, and with only a small $\Delta V$ insertion burn, if required.

The launch tube 16 is levitated by the magnetic repulsion between its attached set of superconducting current cables and a second set on the ground. The strong magnetic levitation force substantially exceeds the weight of the tube and cables; at 22 km altitude, for example, the levitation force is 4 metric tons per meter of tube compared to a weight of 2 metric tons per meter. The resultant net lift force, as well as horizontal forces due to winds, are offset by a network of vertical and angled tensile tethers that reach to, and are anchored at, the ground.

The StarTram design is based on existing materials, superconductors, and cryogenics, and appears technically and economically feasible. It incorporates large safety margins and multiple redundancy for reliability and the avoidance of single point failures.

The point design considered in this description is for a manned vehicle corresponding to the following launch conditions: 1) launch height=22 km, 2) launch angle=5 degrees, and 3) launch velocity=8 km/sec. These are nominal values which demonstrate the usefulness of the StarTram launch system. Other combinations of launch height, launch angle and launch velocity may lead to a more optimal designs. Also, the lengths of the acceleration tunnel and the levitated launch tube in this description are determined by the g-forces which ordinary humans could tolerate (~2.5 g). If the vehicle were used only for cargo, with presumably much higher g-load tolerance, the tunnel and levitation tube could be shortened very appreciably.

In 1996, Powell and Danby, [See Powell, J. R. and Danby, G. T., "Electromagnetic Inductive Suspension and Stabilization System for a Ground Vehicle," U.S. Pat. No. 3,470, 828, Filed Nov. 21, 1967, Granted Oct. 7, 1969; and Powell, J. R. and Danby, G. T., "Magnetically Suspended Trains: The Application of Superconductors to High-Speed Transport,"*Cryog. Indust. Gases,* pp. 19–24, 1969, proposed using superconducting (SC) magnets to magnetically levitate (Maglev) and propel high speed passenger vehicles.

SC magnets on the vehicle induce opposing currents in ambient temperature aluminum guideway loops, stably levitating the vehicle with a large clearance (about 20 cm). A small AC current (about $10^3$ A) carried in separate guideway loops propels the vehicle, which is phase locked in the AC current wave as a Linear Synchronous Motor (LSM). The vehicle speed equals the product of frequency and pole pitch, regardless of drag force variations.

Japanese Maglev vehicles have operated at about 156 m/sec (350 mph), and the first 42 km section of a 500 km commercial route between Tokyo and Osaka is under construction. Low pressure tunnels for vehicle speeds of 1 to 2 km/s have been proposed in the past, because Maglev vehicles operating in the atmosphere are limited by air drag.

Even greater speeds, including orbital values, appear possible in evacuated tunnels. The spacecraft 12 in the form of a Maglev vehicle accelerating at 2 g would reach 8 km/sec in a 1600 km evacuated tunnel. The high magnetic lift to drag ratio (about $10^4$) and high LSM motor efficiency, would let the Maglev spacecraft reach orbital speeds with almost 100 percent efficiency.

Figure 2:
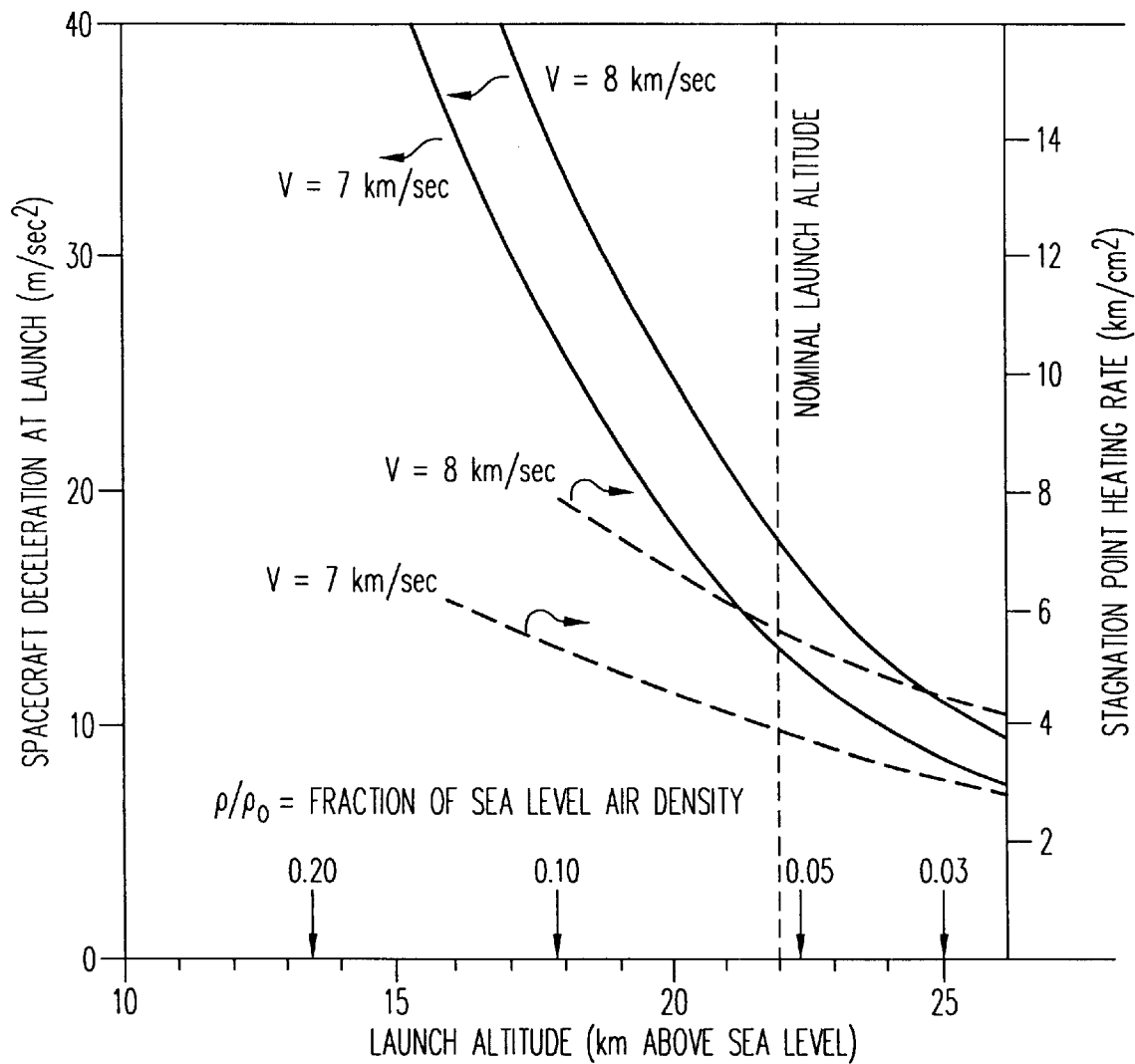
FIG. 2 is a graph of spacecraft deceleration and stagnation point heating rate as a function of launch altitude.

At such speeds the spacecraft would disintegrate if launched from the earth's surface, because of atmospheric forces, deceleration, and heating. If launched at high altitude where air density is very low, however, the Maglev spacecraft could reach orbit without damage. FIG. 2 shows the predicted deceleration and nose heating as a function of launch altitude and velocity. For 8 km/s and 22 km altitude, at about 18 km above the ground at selected sites, the initial deceleration (<2 g) and nose heating (<5 $kW/cm^2$) values appear acceptable, and decrease to negligible levels a few seconds after atmospheric entry.

Magnetically assisted launch of spacecraft from the earth's surface has been previously investigated. The Maglifter study of Mankins, J. C., "The MagLifter: An Advanced Concept Using Electromagnetic Propulsion in Reducing the Cost of Space Launch," (AIAA 94-2726), 38*th Joint Propulsion Conference and Exhibit,* Indianapolis, Ind., Jun. 24–29, 1994, found that modest initial velocities (about 300 m/s) significantly increases payload.

In the present invention, the StarTram 10 enables orbital launch velocities and high payload fractions in a new manner. StarTram uses superconducting (SC) cables to magnetically levitate an evacuated launch tube to an altitudes $\geq 22$ km.

StarTram is technically and economically feasible. One site could launch a million tons per year to LEO, 1000 times the present rate, at a unit cost of $10 per kilogram which is about 1/1000 th of the present cost. StarTram requires surprisingly little energy. To deliver a million tons per year to LEO, 2000 MW(e) would be needed, less than 0.5% of US electrical capacity. StarTram would enable humanity to expand into space; space tourism and habitats would become practical, solar power satellites a major world energy source, and colonization of the solar system a reality.

The StarTram design described here may be built using existing materials, superconductors (SC), and cryogenics. Large safety margins are applied to structural stresses and SC current density. Single point failure is prevented by the use of multiply redundant independent SC cables, structures, and tethers. Components can be repaired or replaced if necessary. The system can withstand all conceivable environmental conditions.

Figure 3:
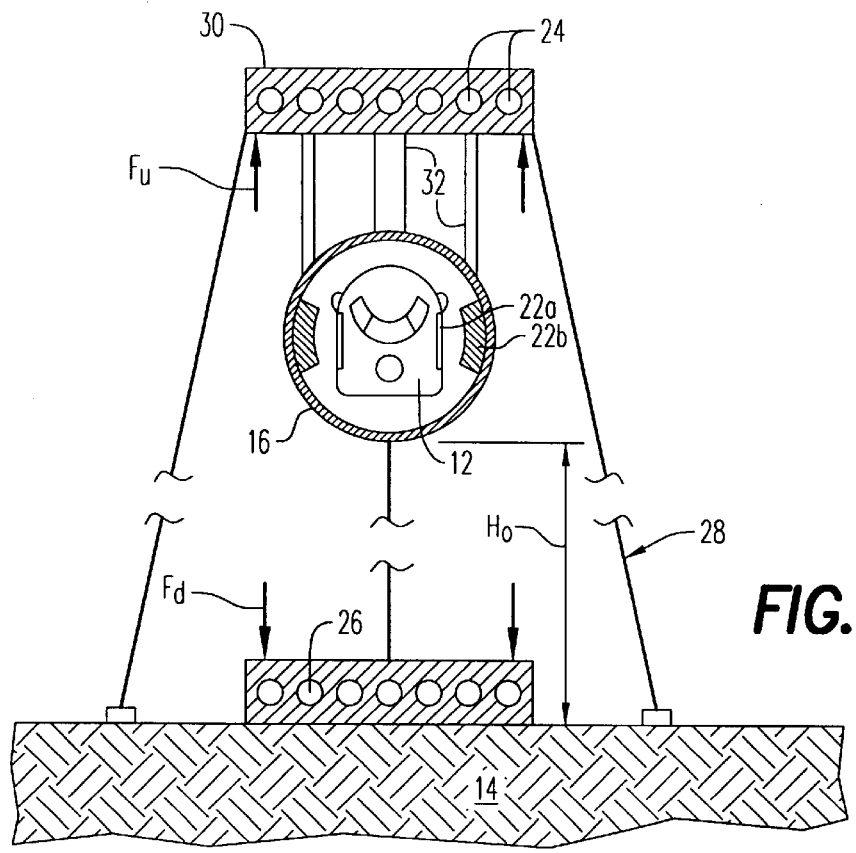
FIG. 3 is an elevational sectional view through a portion of the StarTram system illustrated in FIG. 1 and taken along line 3—3.
Figure 4:
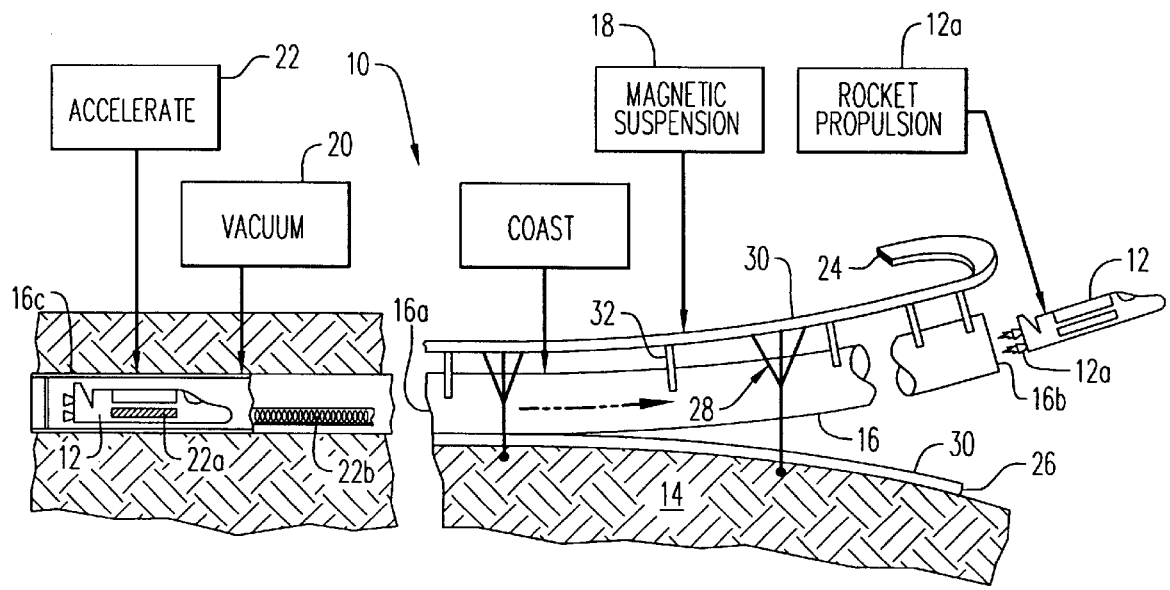
FIG. 4 is a side elevational view of the StarTram system illustrated in FIG. 1 and taken generally along line 4—4.

The StarTram system 10 is illustrated schematically in FIGS. 1, 3, and 4, and includes means 18 for magnetically suspending or levitating the sky tube 16 from the earth. As initially shown in FIG. 4, the sky tube includes an inlet 16*a* at a proximal end fixedly joined on earth, and an outlet 16*b* at a suitably high altitude above sea level.

Means 20 are provided for evacuating air from the sky tube 16 for reducing or eliminating air resistance and drag to the spacecraft launched therethrough. The evacuating means 20 may take any conventional form including a steam jet ejector system for withdrawing air from the sky tube, with the sky tube being suitably sealed at opposite ends by suitable doors, or gas seals effected by ejecting steam jets thereat as desired.

Means 22 are also provided for accelerating and propelling the spacecraft 12 through the sky tube and out its outlet 16*b* to achieve escape velocity for reaching outer space, and earth orbit for example.

As shown in FIGS. 1 and 4, the sky tube 16 initially extends horizontally or generally tangentially to the surface of the earth at the sky tube inlet 16*a,* and is inclined oppositely from the natural round curvature of the earth toward the sky tube outlet 16*b.*

As illustrated in FIG. 4, the spacecraft 12 is preferably propelled through the sky tube by initially accelerating the spacecraft into the inlet of the sky tube on earth, and then allowing the spacecraft to coast through the evacuated sky tube for discharge or launch from its outlet end 16b. Since the sky tube is evacuated of air, the accelerated spacecraft may coast therethrough upwardly from earth for launch from its outlet with little or no air resistance or drag.

As shown schematically in FIGS. 3 and 4, the spacecraft propelling means 22 are preferably in the form of the maglev system wherein the spacecraft is magnetically levitated within the sky tube for eliminating friction therebetween, and is accelerated into the sky tube for launching therethrough.

Any conventional maglev system may be used and typically includes superconducting side magnets 22a mounted on opposite sides of the spacecraft 12 which cooperate with conducting loops or rails 22b formed in the walls of the sky tube.

As shown schematically in FIG. 4, the spacecraft 12 preferably also includes conventional rocket motors 12a which may optionally be used for rocket propelling the spacecraft upon discharge from the sky tube to achieve earth orbit as required depending upon the total weight of the spacecraft being launched.

Referring again to FIGS. 1, 3, and 4, the sky tube magnetic suspending means 18 are illustrated in more detail in a preferred embodiment. Sky tube suspension from earth uses a superconducting levitated cable or sky cable 24 which is configured for generating magnetic up force Fu, and which is fixedly attached to the sky tube 16 from earth to the tube outlet.

A superconducting ground cable 26 extends along the surface of the earth below the sky cable 24 for generating a magnetic down force Fd in magnetic opposition to the up force generated by the sky cable. In this way, the sky cable is magnetically repelled from the ground cable for levitating the sky tube 16 supported by the sky cable.

A plurality of tethers 28 are used for tethering the sky cable and its supported sky tube to earth in magnetic alignment with the ground cable to magnetically suspend the sky cable and attached sky tube above earth in a constrained system being inclined outwardly from earth to high altitude for launching the space craft.

The magnetic force (N/m) on the levitated SC sky cable 24 is:

$$(F_m)_L = f_{GL}\left(\frac{\mu_o}{2\pi}\right)\left(\frac{I_G}{I_L}\right)\frac{I_L^2}{H_O} \quad (1)$$

with the oppositely directed ground ($I_G$) and levitated ($I_L$) cable currents in amps, and the height ($H_O$) of the levitated cable 24 above the ground in meters. The factor ($f_{GL}$) reflects the geometric effects of finite length and positioning. For infinite parallel cables positioned with aligned magnetic and gravitational force vectors, $f_{GL}=1$.

Figure 5:
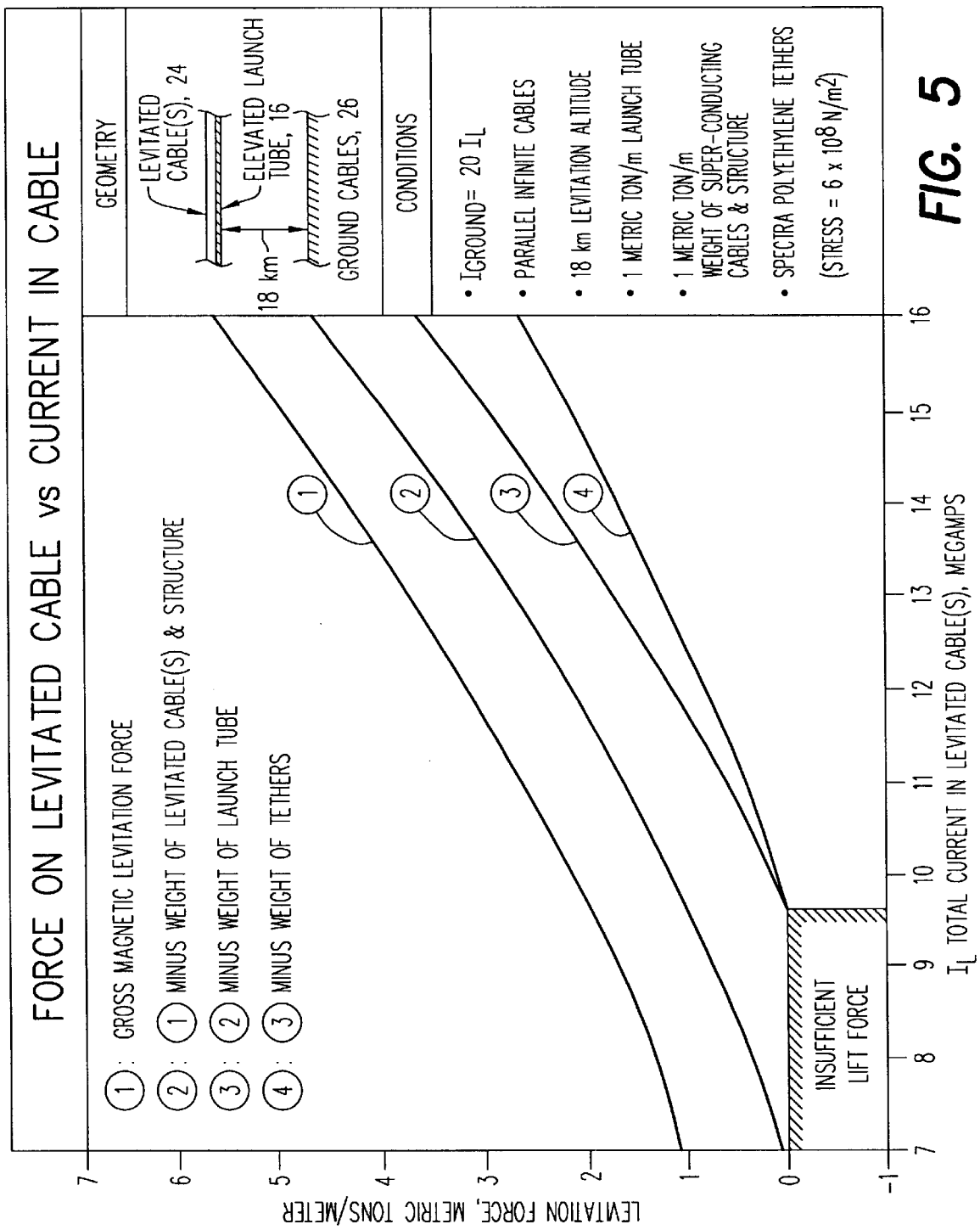
FIG. 5 is a graph of levitation force versus superconducting cable current.

For finite length, multi-cable systems, $f_{GL}$ is about 0.8 to 0.9. FIG. 5 shows the magnetic levitation force (curve 1) as a function of $I_L$ for $f_{GL}=1$ and $H_O=18$ kilometers. The ground cable (26) to levitation cable (24) current ratio ($I_G/I^L$) is constant (=20), and the magnetic lift force increases as $(I_L)^2$.

For a given lift a high $I_G/I_L$ ratio enables a small $I_L$, reducing levitated cable weight. A high $I_G/I_L$ ratio also minimizes the effects of earth's magnetic field. The total amount of superconductor for the ground and levitated cables increases with $I_G/I_L$, but modestly, a factor of 2.3 for $I_G/I_L=20$, as compared to the amount for $I_G/I_L=1$. However, the increase in total cost is a much smaller factor, since the levitated cable costs more ($ per kA·m) than the ground cable. The optimum $I_G/I_L$ ratio appears to be in the range of 10 to 30, subject to detailed studies for a precise value.

The net upwards force (N/m) is the magnetic force minus the weight of the cable and support structure ($M_Pg$) launch tube ($M_{LT}g$) and anchoring tethers ($M_Tg$):

$$(F_m)_L^{**}=(F_m)_L-(M_P+M_{LT}+M_T)g \quad (2)$$

Tether weight depends on the magnitude of $(Fm)_L^{**}$, tether density $\rho(kg/m^3)$, operating stress $S_O(N/m)^2$, height $H_O(m)$ and angle relative to the surface.

FIG. 5 illustrates the effects of cable weight (curve 2), launch tube weight (curve 3), and tether weight (curve 4) at a levitation height of 18 kilometers. Launch tube weight is independent of $I_L$; SC cable and structure weight scales as $(I_L)$ and tether weight scales as $f_T (I_L)^2$, where $f_T$ is the fraction of the magnetic lift restrained by tethers.

Launch tube weight depends on the ambient atmospheric pressure, increasing at lower altitudes, but the greater magnetic lift force more than compensates.

Tether weight is minimized by lightweight materials having high tensile strength (about 3 GPA) and moduli (about 200 GPa) such as Kevlar and oriented polyethylene (Spectra). Net lift force (curve 4) is positive when $I_L>(I_L)_O$; at $I_L=12$ megamp, the net lift force is 1 metric ton per meter, about 25% of the total magnetic lift force. The net lift fraction increases with $I_L$.

As shown in FIG. 4, the propelling means 22 preferably also include an acceleration tunnel 16c buried in the earth at a suitable altitude above sea level, which is joined coextensively with the inlet end of the sky tube 16 as an earth-bound extension thereof. The superconducting magnetic rails 22b extend along the acceleration tunnel for levitating the spacecraft and accelerating the spacecraft underground for providing the propulsion energy to launch the spacecraft through the elevated sky tube.

Figure 6:
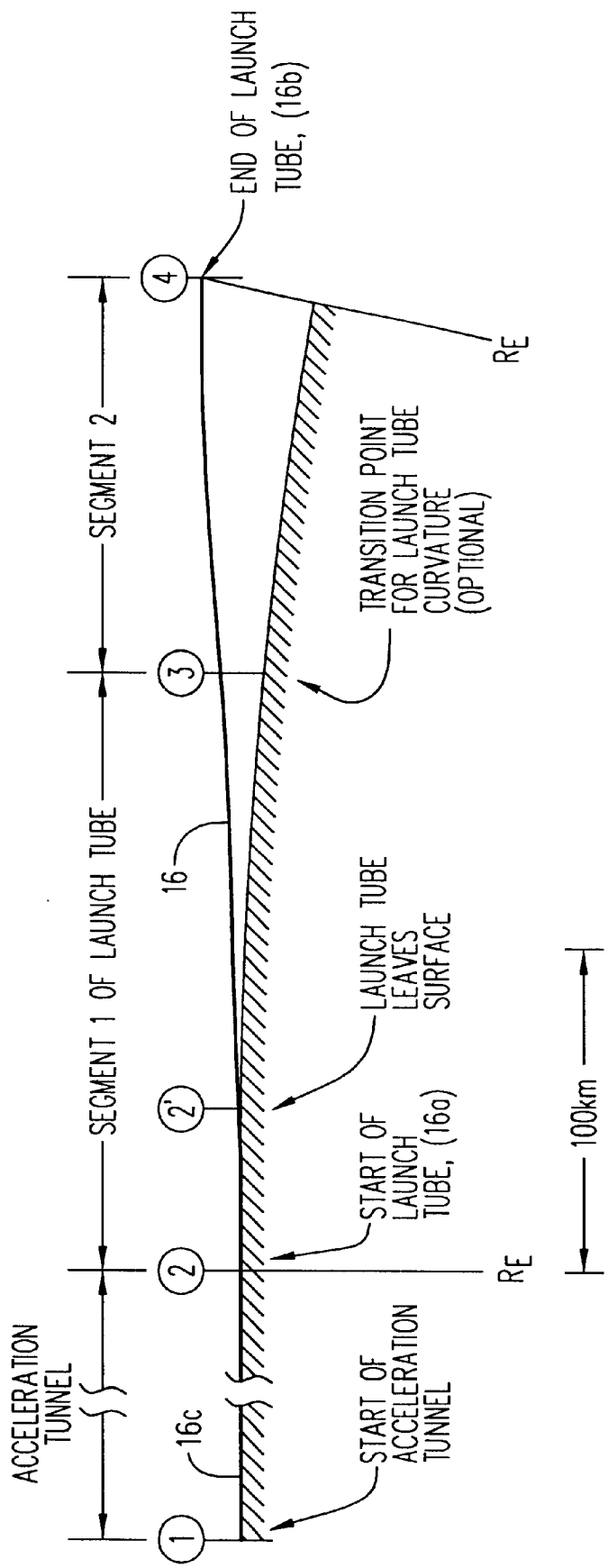
FIG. 6 is a schematic configuration of the trajectory of the sky tube illustrated in FIG. 1.

FIG. 6 shows the geometry of the StarTram launch tube 16 and the integral acceleration tunnel 16c. The spacecraft 12 illustrated in FIG. 4 starts at point 1, accelerates ($a_{12}$; where subscripts identify position numbers, e.g. point 1 to point 2) to launch velocity ($V_2$) at point 2, coasts upward in the launch tube to outlet point 4, and then enters the atmosphere.

The ground level acceleration tunnel 16c is at elevation, $h_{12}$, above sea level, with length $S_{12}$. For $a_{12}=20$ m/sec$^2$(2 g) and $V_2=8000$ m/s, $S_{12}$ is 1600 km:

$$S_{12}=V_2^2/2a_{12} \quad (3)$$

Figure 8:
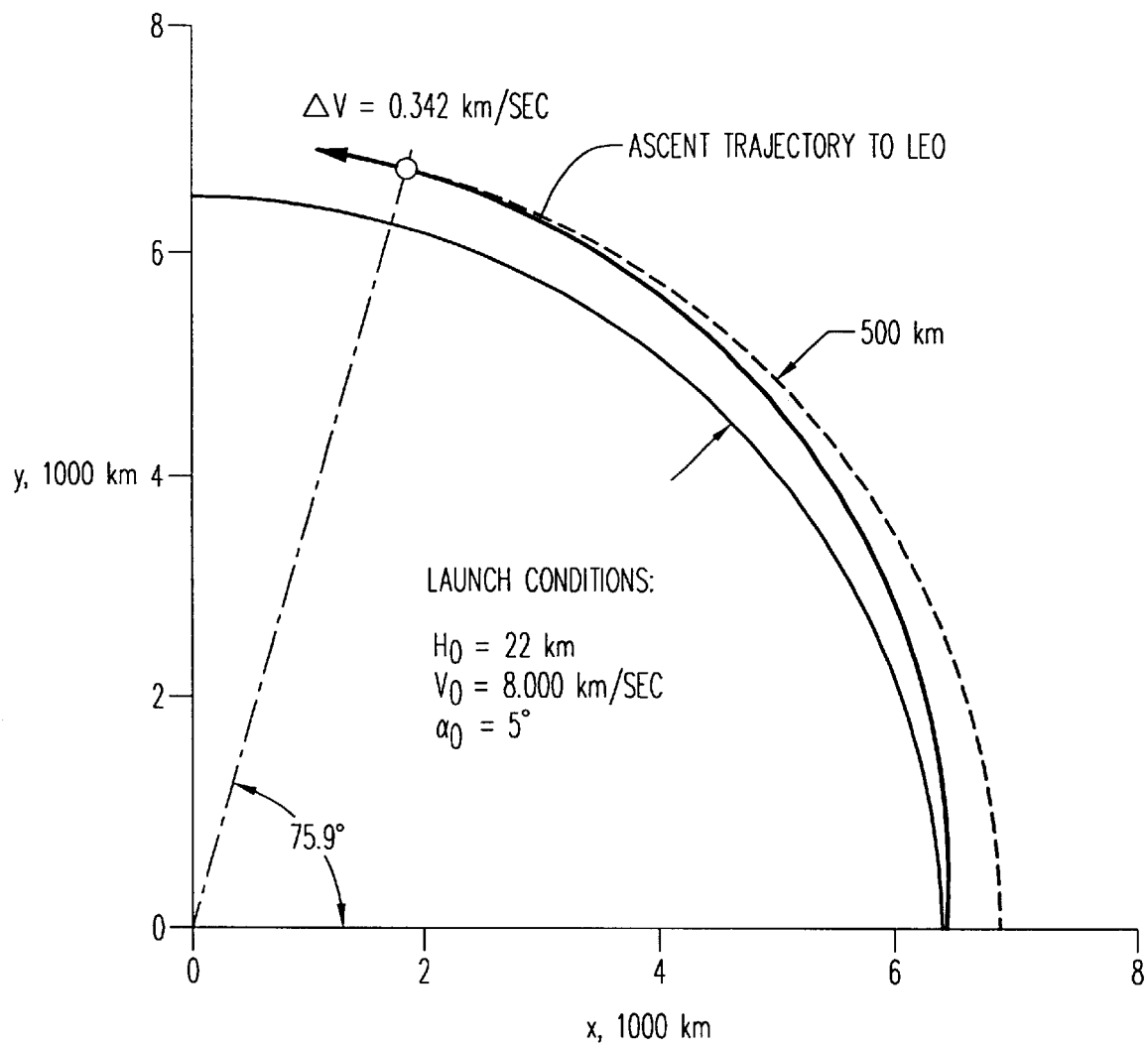
FIG. 8 is an exemplary ascent trajectory for low earth orbit (LEO) launching of the spacecraft illustrated in FIG. 1.
Figure 9:
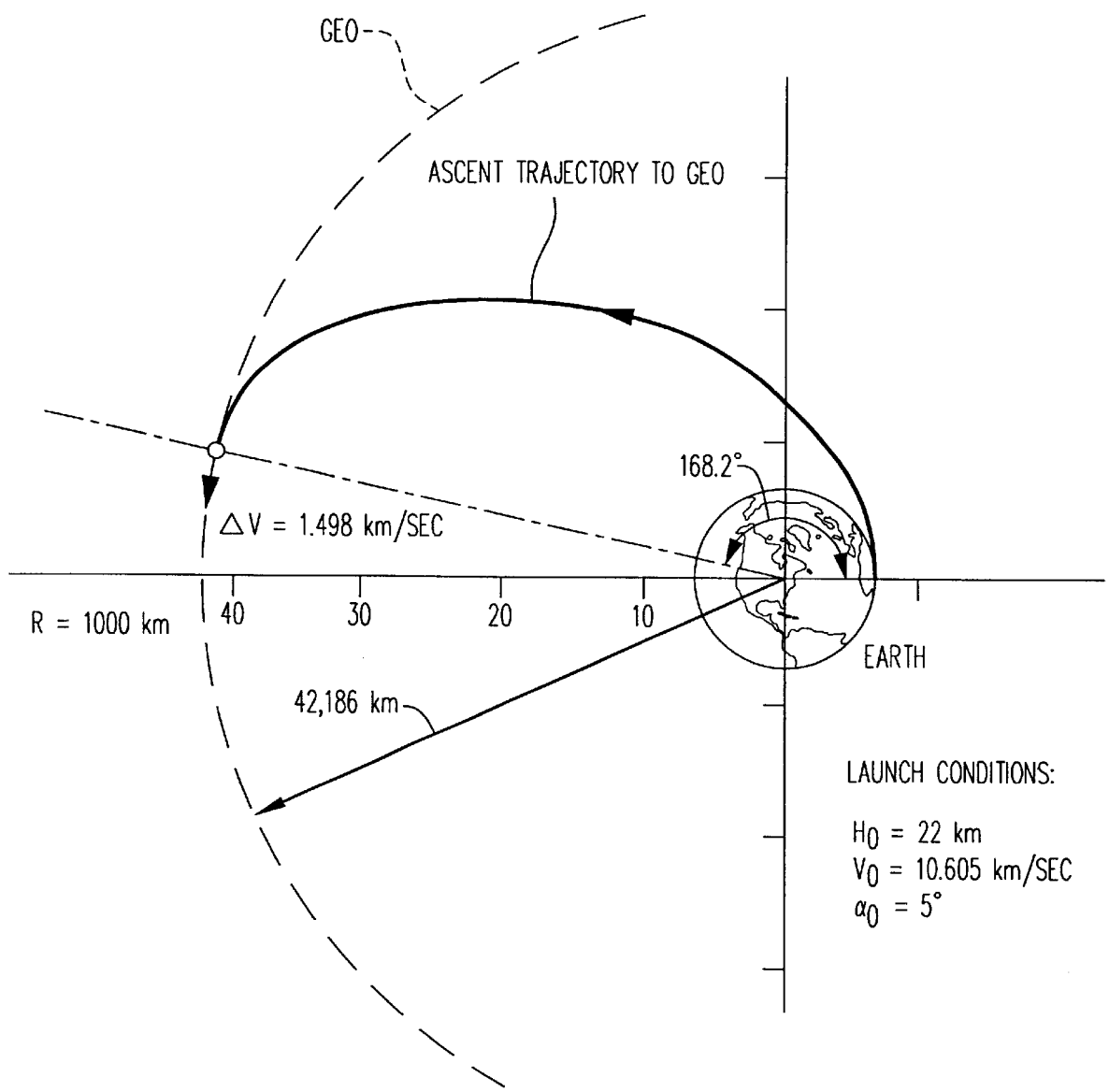
FIG. 9 is an exemplary ascent trajectory for geosynchronous earth orbit (GEO) launching of the spacecraft illustrated in FIG. 1.

Constraints on launch altitude and angle affect the launch tube trajectory. Altitude should be $\geq 22$ km and the launch angle about 5 degrees relative to the horizon. Steeper angles need excessive ΔV burn from the rocket motors 12a for orbit insertion, while shallower angles cause excessive atmospheric heating. At 5 degrees and 8 km/s launch velocity, the ΔV insertion burn for a 500 km (LEO) orbit is only 0.35 km/s as shown in FIG. 8. At 10 km/s launch velocity, GEO orbit requires a ΔV burn of only 1.5 km/s as shown in FIG. 9. Various launch trajectories have been examined.

A tangent trajectory (i.e., a straight line tangent to point 2) is too long, about 500 km. A trajectory with constant upwards curvature reaches 22 km in only 260 km (centripetal acceleration of 2.5 g), but the launch angle, 8.3 degrees, is too steep. The ΔV burn for LEO is about 1 km/sec, which significantly reduces payload. Altitude and angle requirements with acceptable launch tube length can be achieved with a variable curvature trajectory shown in FIG. 7.

Figure 7:
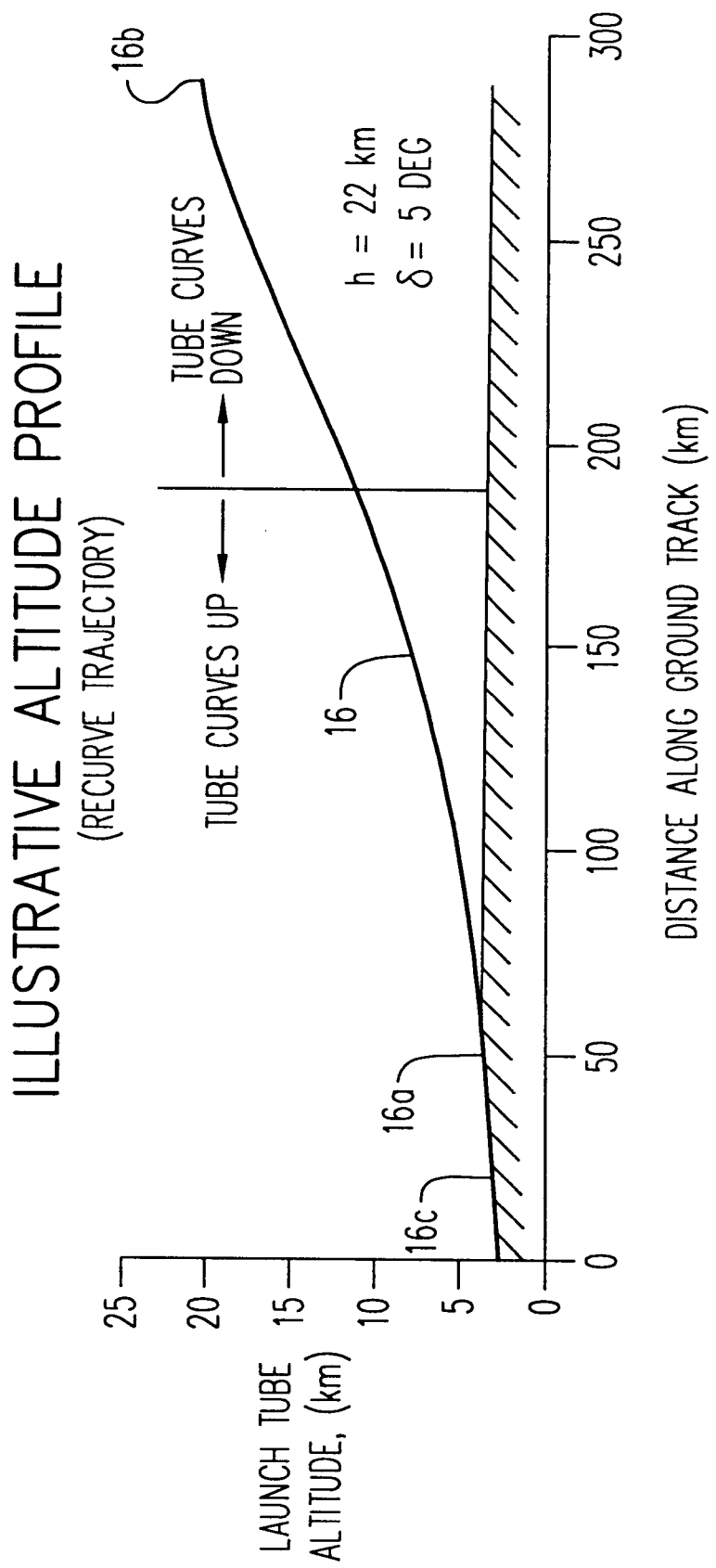
FIG. 7 is a graph of a preferred embodiment of the altitude profile of the sky tube illustrated in FIG. 6.

The sky tube 16 illustrated in FIG. 7 preferably has a variable curvature trajectory between its inlet 16*a* and outlet 16*b*, and initially curves upward from the inlet to a transition point at intermediate altitude, and then curves downward to the outlet in two corresponding segments.

Segment 1 of the trajectory curves upward with centripetal acceleration $a_{23}$ ($R_{23}$=Radius of curvature):

$$a_{23} = V_2^2 / R_{23} \tag{4}$$

While segment 2 curves relatively downward with centripetal acceleration $a_{34}$ ($R_{34}$=Radius of curvature):

$$a_{34} = V_2^2 / R_{34} \tag{5}$$

The location of the transition (point 3) between the two segments depends on the values of $a_{23}$ and $a_{34}$. FIGS. 6 and 7 assume $a_{23}$=25 and $a_{34}$=35 m/sec². The acceleration perceived by passengers in the two segments is constant because the effect of the gravity vector changes.

In segment 1, at the distance s from point 2 (s=0), the launch tube altitude is (neglecting second order terms):

$$h(s) = \frac{s^2}{2R_E}\left[1 + \frac{R_E}{R_{23}}\right] + h_2 \tag{6}$$

where $R_E$ is the earth's radius (6360 km for polar launch) and $h_2$ the altitude above sea level at s=0. The launch tube angle is:

$$\delta(s) = \frac{s}{R_E}\left[1 + \frac{R_E}{R_{23}}\right] \tag{7}$$

The altitude and launch angle in segment 2 are:

$$h(s) = \frac{(s - s_{23})^2}{2R_E}\left[1 - \frac{R_E}{R_{34}}\right] + \delta_3(s - s_{23}) + h_3 \tag{8}$$

$$\delta(s) = \delta_3 + \frac{(s - s_{23})}{R_E}\left[1 - \frac{R_E}{R_{34}}\right] \tag{9}$$

In the FIGS. 6 and 7 example, total tube length ($S_{24}$) is 283 km, though the tube only leaves the surface at point 2*. For a 1 km rise in ground elevation, $s_{22}$*=63 km, making the levitated section 220 km long. A 3 km rise in ground elevation cuts the levitated length to 176 km. Increasing the centripetal acceleration to values above 3.5 g further reduces levitated length.

Table 1 lists system parameters assuming modest centripetal acceleration (2.5g) and a 1 km rise to point 2*. Less conservative assumptions reduce the levitated length and cost of the launch tube.

TABLE 1

StarTram System Parameters

| | Nominal Value |
|---|---|
| Spacecraft (12) | |
| Launch Velocity | 8 km/s |
| Launch Altitude (Above Sea Level) | 22 km |
| Gross Weight | 200 MT |

TABLE 1-continued

StarTram System Parameters

| | Nominal Value |
|---|---|
| Empty Weight | 100 MT |
| Payload to LEO | 70 MT |
| Overall Dimensions | 5 m × 5 m × 30 m |
| $C_D$ | 0.086 |
| $A_{base}$ | 19.6 m² |
| $A_{mass}$ | 0.25 m² |
| Launch Kinetic Energy | 1.8 Gw Hr |
| Atm Deceleration at Launch | 17 m/sec (1.7g) |
| ΔV Loss Through Atm | 0.05 km/s |
| ΔV Burn to LEO | 0.35 km/s |
| Time to Reach Orbit | 18.5 minutes |
| Acceleration Tunnel (16c) | |
| Length | 1600 km |
| Ground Elevational (Above Sea Level) | 3 km |
| Longitudinal Acceleration | 20 m/sec² (2g) |
| Velocity at End | 8.02 km/s |
| Time in Tunnel | 6.7 minutes |
| Acceleration Power (Avg.) | 16 GW(e) |
| Launch Tube (16) | |
| Total Length | 281 km |
| Length of Levitated Section | 220 km |
| Ground Elevational (Above Sea Level) | 3 km @ Start; 4 km @ End |
| Trajectory Shape | Recurve |
| Launch Angle | 5 Degrees |
| Centripetal Acceleration | 25 m/sec² (2.5g) |
| Time in Tube | 0.58 minutes |

The local levitation height, $h_L(s)$, of the launch tube above the ground is:

$$h_L(s) = h(s) - h_E(s) \tag{10}$$

where $h_E(s)$ is the elevation of the ground above sea level.

In Table 1, the levitation height under the outlet terminus 16*b* of the launch tube is $h_L(s_4)$=22−4=18 km. The spacecraft is in segment 1 of the launch tube for 26 seconds and 9 seconds for segment 2, compared to 400 seconds in the acceleration tunnel. The tunnel and launch tube g forces appear suitable for passengers.

The spacecraft velocity at the beginning of the launch tube is slightly greater than at the exit:

$$V_4 = \{V_2^2 + 2\bar{g}_{24}(h_4 - h_2)\}^{1/2} \tag{11}$$

where $\bar{g}_{24}$ is the average gravitational acceleration between $h_2$ and $h_4$. For an exit velocity of 8000 m/sec, entrance velocity is 8023 m/sec. After the vehicle has accomplished its mission in orbit, it is slowed to suborbital velocity with rocket thrust. During vehicle reentry and horizontal landing the vehicle has deployed wings.

The launch tube 16 is a cylindrical shell of about 7 meters inside diameter, for example. Internal supports and normal temperature aluminum loops 22*b* levitate and guide the high velocity Maglev spacecraft 12 along the evacuated launch tube. The 15 centimeter thick wall of the launch tube is made of graphite-epoxy honeycomb, with an equivalent solid fraction of 10%.

The external collapsing pressure of the launch tube is estimated to be 2.6×10⁵ N/m², based on standard engineering formulas. This is a factor of 60 greater than the ambient pressure of 4×10³ N/m² at 22 km altitude. Such a large safety margin appears more than sufficient. At low altitudes, where the ambient pressure approaches 10⁵ N/m², a substantially thicker wall, e.g., 45 cm, would be used. Since collapsing pressure scales as the cube of wall thickness, the safety margin at low altitude is comparable to that at high altitude.

The probability of air leaks into the evacuated interior of the launch tube is negligible if the tube wall honeycomb is made of multiple independent and redundant closed cells. These are connected to form an integrated structural unit. If a crack occurs in the wall of one cell, external air cannot flow into the tube's interior, since the adjacent cells retain their integrity. For air to enter, all of the adjacent cells at one location in the tube wall would have to fail. If cracks and failures are randomly distributed, the probability of this is infinitesimally small.

The StarTram launch tube wall preferably has 6 layers of independent cells in the honeycomb, with the surface area of each cell less than 1 m². The chance of a through-leak in the tube wall over a period of 30 years is much smaller than $10^{-9}$.

The end outlet 16b of the evacuated launch tube has to prevent entry of the external atmosphere at 22 km altitude, yet allow exit of the spacecraft. Various end window options have been examined, including retractable diaphragms, thin plastic film burst diaphragms (e.g., about 50 microns thickness), MHD pumps, and gas dynamic ejectors (e.g., steam or air). The mechanical and burst diaphragm options have potential problems involving premature opening or timing, and are vulnerable to single point failure. At this point the gas dynamic option appears to be the leading candidate for the end window at the tube outlet 16b.

Various levitated cable configurations have been evaluated for lift capability, stability, technology, cost, and reliability. The favored configuration is a tilted linear dipole loop of variable width shown in FIG. 1.

As illustrated in FIG. 1, the sky cable 24 and the ground cable 26 are each preferably in the form of a dipole continuous loop, and the sky tube 16 is suspended below a portion of the sky cable loop.

The sky and ground cable loops 24,26 have teardrop configurations with two legs diverging from proximal ends on earth to distal ends having a maximum spaced apart width at altitude. The sky tube 16 is suspended below one of the two sky cable legs.

If desired, a pair of the sky tubes 16 may be suspended from corresponding ones of the two sky cable legs for providing independent launch tubes.

Accordingly, each side of the loop may support a separate launch tube 16. The two tubes 16 may have a common or separate acceleration tunnels. The dual tube arrangement provides redundancy since one tube can operate while the other is serviced or repaired. It also can enable a low latitude StarTram site to launch into different orbital inclinations. An included angle of about 20 degrees would allow spacecraft to reach orbits between equatorial and 40 degrees inclination with only a small ΔV burn for plane change.

Lift capability is not diminished by having dual launch tubes, since each side of the loop primarily interacts with the ground cable leg underneath it. Modifying equation (1), the levitation force (N/m) on each side of the loop is:

$$(F_m)_L = f_{GL}\left(\frac{\mu_O}{2\pi}\right)\left(\frac{I_G}{I_L}\right)\left(\frac{I_L^2}{H_O}\right)x \quad (12)$$

$$x\left[\frac{H_O^2}{H_O^2 + \Delta W^2} - \frac{H_O^2}{H_O^2 + (W_O + 2\Delta W)^2}\right]$$

where $W_O$ is the width of the ground dipole loop, $W_O+2\Delta W$ is the width of the levitated dipole loop, ($\Delta W>0$), and $H_O$ the levitation height. The first term in brackets is the upwards magnetic force from the ground cables directly underneath. The second term is the downwards force from the ground cables on the opposite side of the loop.

Typically, this is $\leq 10\%$ of the upwards force. Each side of the levitated loop also experiences a horizontal magnetic force (N/m):

$$(F_m)_H = f_{GL}\left(\frac{\mu_O}{2\pi}\right)\left(\frac{I_L^2}{H_O}\right)\{T1 - T2 - T3\} \quad (13)$$

$$T1 = \left(\frac{I_G}{I_L}\right)\left[\frac{(W_O + \Delta W)H_O}{H_O^2 + (W_O + \Delta W)^2}\right]$$

$$T2 = \left(\frac{I_G}{I_L}\right)\left[\frac{\Delta W H_O}{H_O^2 + \Delta W^2}\right]; T3 = \frac{H_O}{H_O + 2\Delta W}$$

The first term T1 is the inwards force towards the dipole center caused by the ground cables on the opposite side of the loop; the second term T2 is the outwards force caused by ground cables underneath; and the third term T3, a much smaller term, is the outwards force from the levitated cable on the other side of the loop. The net horizontal magnetic force on the levitated cable can be inwards, outwards, or zero, depending on the values of $W_O/H_O$ and $\Delta W/H_O$. Neglecting the small third term in equation (13), net horizontal force is zero when:

$$\frac{\Delta W}{W_O + \Delta W} = \frac{H_O^2 + \Delta W^2}{H_O^2 + (W_O + \Delta W)^2} \quad (14)$$

Solving for $\Delta W/H_O$, $$\frac{\Delta W}{H_O} = \frac{1}{2}\frac{W_O}{H_O}\left[\sqrt{1 + 4\left(\frac{H_O}{W_O}\right)^2} - 1\right] \quad (15)$$

For $W_O/H_O=3$, $\Delta W/H_O 0.304$. Accordingly, at $H_O=18$ km, the maximum width of the ground dipole loop 26 is 54 km, and the maximum width of the levitated loop 24 is 65 km.

The precise $\Delta W$ for which the net magnetic force is zero depends on the actual loop details, including how rapidly dipole width varies with length, and finite length effects. For this example, the net horizontal force is assumed to be zero, though in the actual system it may be desirable to have a non-zero net force.

In the preferred embodiment illustrated in FIGS. 1, 3, and 4, a plurality of redundant sky cables 24 are integrally formed in a supporting platform 30 in a common sky platform loop. The sky tube 16 is fixedly suspended from the sky platform 30 by suitable struts 32 extending vertically therebetween.

The sky platform 30 preferably has a rectangular cross section, and a plurality of the sky cables 24, such as seven, are laterally aligned coplanar therein.

Figure 10:
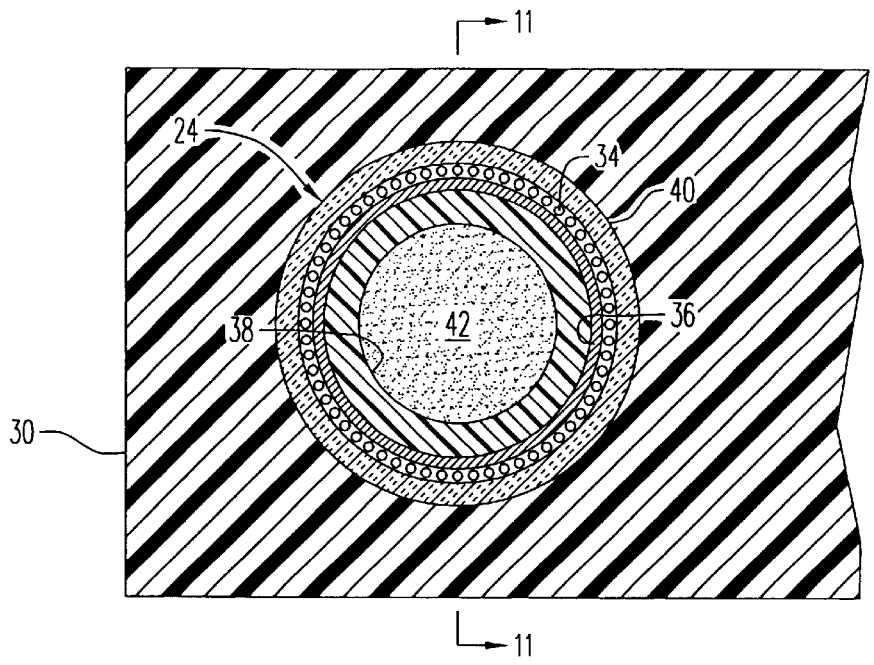
FIG. 10 is a sectional view through a portion of the sky platform illustrated in FIG. 1 having a plurality of superconducting sky cables therein.

The StarTram levitated cables are thusly held inside a thin, wide (1 m×12 m) rigid platform structure made of lightweight, high strength graphite epoxy composite as shown in FIGS. 3 and 10. The platform is connected to and spaced from the launch tube underneath by graphite epoxy struts 32, forming an integrated, rigid structure. The distance of separation is on the order of 30 meters, so as to reduce the fringe field strength in the launch tube to less than 1000 gauss.

The attractive magnetic forces between the cables 24 in the platform are much stronger, by a factor of about 100, than the magnetic levitation force caused by the ground cables. The strength of this attractive force depends on the position of the cable in the platform and the distance between them.

For the StarTram design described here, the center cable in the array of 7 cables, for example, has zero net magnetic force, while the 2 outer cables experience the largest forces, a net force of 9.9×10⁵ N/m directed towards the center of the platform. This is approximately 160 times greater than their levitation force, based on a cable separation of 2 meters.

These attractive forces are carried in compression by graphite-epoxy honeycomb reinforcement structures placed between the cables, with the amount of structural material determined by local loading. Additional reinforcement struts may be incorporated above, below and between the cables, inside the platform resulting in a rigid, strong platform. Maximum structural stress in the graphite epoxy composite is $2\times10^8$ N/m² (30,000 psi), which is far below its ultimate strength. The total weight of the platform 30, including cables 24 and connecting struts 32 to the launch tube 16, is estimated at 10,000 N/m of launch tube (1 MT/m).

The StarTram design described here is based on existing liquid helium cooled (T=4 K), multi-filament NbTi superconductor. Liquid nitrogen cooled (T=75 K) superconductors may render NbTi and helium obsolete by the time StarTram is built. Critical current densities of about $10^6$ A/cm² at 4 Tesla and 75 K in $Yba_2Cu_3O_{7-\delta}$ films deposited on flexible nickel substrates have been achieved. Commercial versions of such high temperature superconductors would make StarTram simpler and cheaper.

The largest superconducting project to date was the superconducting Super Collider (SSC). The SSC was to be 87 km in circumference, comprised of two collider rings with 3972 long (15 m) dipole magnets and 196 short (13 m) dipole magnets in each ring, along with thousands of additional quadruple and corrector magnets. The total amount of NbTi superconductor was about 1000 metric tons.

Although StarTram would be physically larger than the SSC, its cryogenic engineering would be much simpler. The StarTram NbTi superconductor would operate at lower fields and further from critical current limits than the SSC conductor, and its field and current would be constant, not periodically ramped. Moreover, unlike the SSC, accurate placement of conductors and precise control of field magnitude and direction is not required. Finally, StarTram does not have SSC's many thousands of magnet current leads, with their attendant mechanical and heat leak problems.

The StarTram NbTi conductor strands may be similar to the SSC inner conductor. The conductor strands may contain 7450 NbTi filaments (6μdiameter), with a Cu/SC ratio of 1.3/1. The critical current density was $1.64\times10^5$ A/cm² at 7 Tesla, and $2.70\times10^5$ A/cm² at Manufacturing reproducibility is excellent, and critical current was not significantly degraded when fabricated into multi-strand conductor. The fabricated SSC multiple (30) strand conductor have a critical current of 10.9 kA at 7 T. Individual strands can be produced in lengths ≧3 kilometers.

A surprisingly small amount of superconductor is required for the levitated StarTram cables. Each of the 7 cables on the levitated platform 30 carries 2.07 megamps; at a design current density of $2\times10^5$ A/cm², each cable then requires only about 10 cm² of NbTi superconductor to carry its supercurrent. Adding in 13 cm² of copper stabilizer (Cu/SC ratio of 1.3/1) the total conductor volume per cable is only 23 cm², with a corresponding weight of 20 kilograms per meter.

Although the amount and weight of the superconductor in a StarTram levitated cable is small, there are a number of requirements that strongly impact on the cable design, and affect its size, weight and operating parameters.

The first requirement that must be satisfied is that the diameter of the conductor region must be large enough that the operational current density is less than the critical current density at the corresponding value of the surface magnetic field.

Consider a single cable carrying a current $I_L/N$ amps ($I_L$ is the total current in the array of N cables (e.g., N=7) on the platform. The maximum azimuthal magnetic field $(B_\theta)_{MAX}$ (in Tesla) at the surface of a cylinder of radius $r_C$ (meters) on which the superconductor is positioned as a current sheet is:

$$(B_\theta)_{max} = \frac{\mu_O}{2\pi}\left(\frac{I_L}{N}\right)\left(\frac{1}{r_C}\right) \quad (16)$$

The value of $r_C$ must be large enough that the magnitude of $(B_\theta)_{MAX}$ is compatible with the allowable critical current density $J_C$ (amps/cm²). For NbTi superconductor in the operating range considered for StarTram, $J_C$ tends to scale as the inverse of $(B_\theta)_{MAX}$, i.e.

$$J_C = K(B_\theta)^{-1} \quad (17)$$

For the SSC conductor, the critical current density at B=5.6 Tesla is $2.42\times10^5$ Amp/cm².

Based on the radius of $r_C$=0.15 meter, and an array of 7 cables on the platform $(B_\theta)_{MAX}$ is 2.67 Tesla. The critical current density for the SSC type superconductor would then be $5\times10^5$ amps/cm², for $(B_\theta)^{-1}$ scaling. The operating $J_{JC}$ of $2\times10^5$ A/cm² is thus only about 40% that of the critical current density. This provides a very large safety margin during normal operation.

If a section of one of the cables were to transition to the normal state, its current would be automatically diverted into the other cables. Under these conditions, the drop in total current in the array, and the local increase in magnetic field in the sections of the other co-cables that paralleled the section that had transitioned to the normal state would be quite small. There would be an accompanying drop in the critical current density, but the safety margin would essentially remain constant.

The probability of having enough adjacent sections in the 7 parallel cables transitioning to the normal state that system failure could occur is negligible.

If the seven cables on the platform are not cross connected, then transition to the normal state at any point in a given cable will cause the entire cable to go normal. Most of the current that had been carried by the transitioned cable will inductively transfer to the remaining superconducting cables on the platform. This will then cause the surface field and the current density to increase in the remaining cables, reducing the safety margin between the operating and critical current densities.

At some point, if a large enough fraction of the N cables transition to the normal state, the operating current density and the surface magnetic field in the remaining cables will sufficiently increase that their critical current density limit is reached, and all of the cables would then go normal, causing loss of levitation.

This worst case was analyzed, and it was used as the basis for the choice of such design parameters as operating current density, conductor radius, and the number of cables, N, to ensure an adequate safety margin.

For the design choices of $J_{SC}=2\times10^5$ Amp/cm², $r_C=0.15$ meter, and N=7, three of the seven cables on the platform would completely transition to the normal state, and levitation capability would still be maintained. In this situation, $J_{SC}$ would increase to $2.12\times10^5$ Amp/cm², and $(B_\theta)_{MAX}$ would reach 4.16 Tesla. The corresponding critical current density, $J_C$, at this field would be 3.25 Amp/cm² which would be slightly greater than the $3.12\times10^5$ Amp/cm² value for $J_{SC}$. The actual safety margin would be greater however, since the average field on the superconductor is only about 50% of the maximum. Since the filaments in the actual monolithic conductor are effectively in parallel, these filaments operating at $B_\theta < (B_\theta)_{MAX}$ would still be well below their individual critical current limit.

By basing the choice of design parameters on a very unlikely worst case scenario, and then using a cross connection approach between cables that greatly enhances system redundancy, it is believed that a very robust levitated cable system can be achieved—one that should be virtually incapable of losing levitation capability.

The second requirement that must be satisfied is that the magnetic forces on the superconducting winding must be transferred to a support structure which holds the winding firmly in place while still enabling good cooling.

Figure 11:
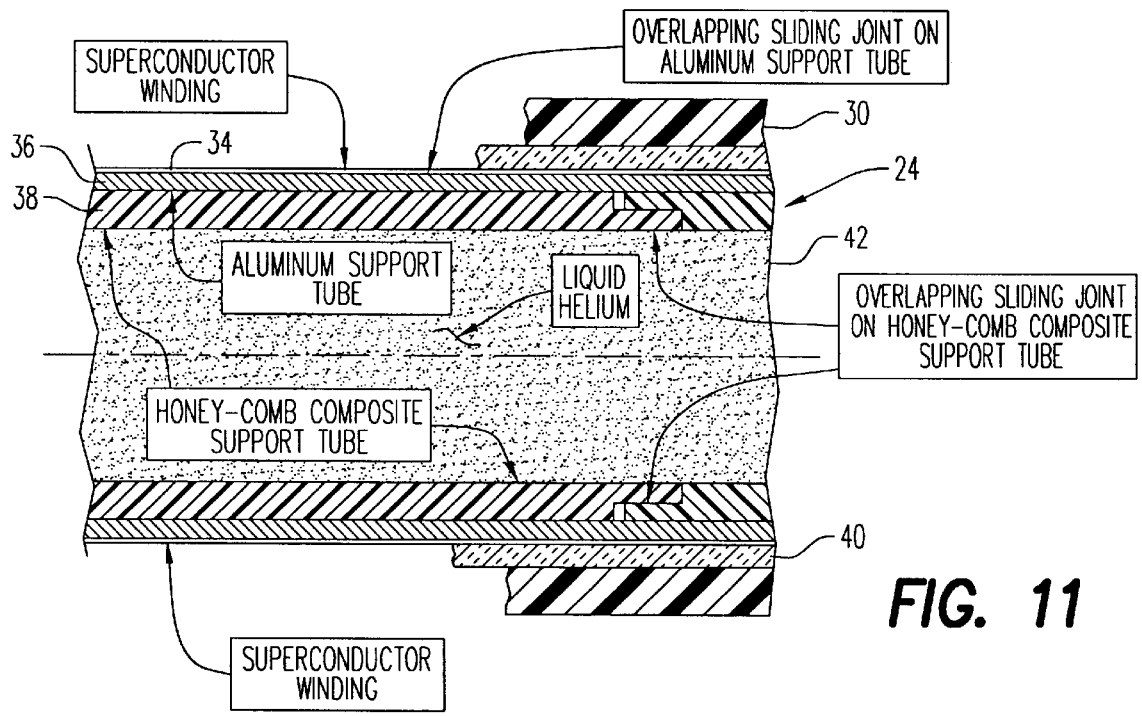
FIG. 11 is an axial sectional view through the sky cable illustrated in FIG. 10 and taken along line 11—11.
Figure 12:
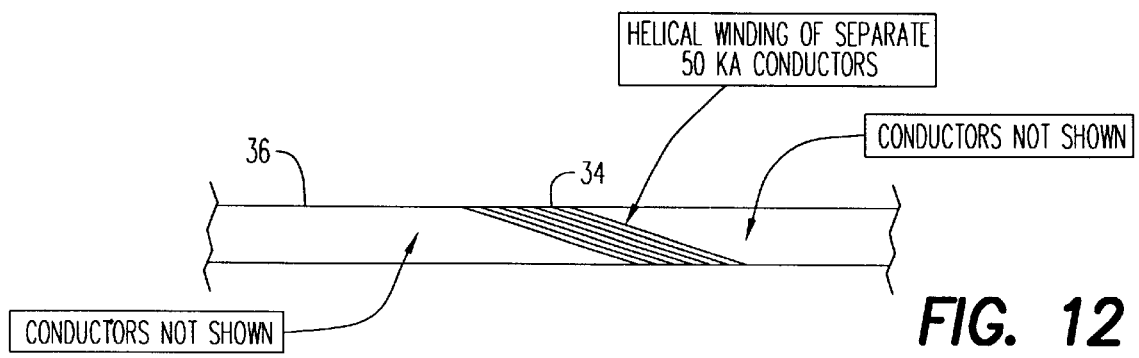
FIG. 12 is a schematic representation of conductor winding for the sky cable illustrated in FIGS. 10 and 11.

FIGS. 11 and 12 illustrate the mechanical support structure for the conductor winding inside each of the StarTram levitated cables with the separate support structure platform 30 that holds the 7 cables in place against their interactive magnetic forces being described above.

Each of the levitated cables 24 has forty individual conductors 34, each carries 50 kiloamps (KA), for a total cable current of 2.07 megamps. The 40 conductors are helically wound on a 30 centimeter diameter cylindrical aluminum tube 36. Each conductor consists of a high purity matrix in which are imbedded the superconducting NbTi/Cu strands.

The helical winding has a relatively long pitch with the pitch length considerably larger than the diameter. As a result the magnetic force on the long pitch helical winding closely approximates that for a winding in which the conductor direction is purely longitudinal. In this case, the radially inwards magnetic pressure Pm (Newtons/in²) is given by:

$$Pm = \frac{(B_\theta)^2_{max}}{2\mu_O} \qquad (18)$$

The cylindrical support tube is actually a close fitting double tube. The outer tube 36 is made of aluminum, with a center core of high purity (99.999%) aluminum. The inner tube 38 is made of graphite epoxy honeycomb.

The inner tube 38 provides the mechanical support to withstand the radial inwards magnetic pressure, while the outer tube 36 acts to widely disperse heat that may be released by momentary local conductor movements and/or flux jumps. This helps to ensure that the superconductor windings operate in an essentially uniform temperature environment, minimizing the chances of a transition to the normal conducting state. The cold high purity aluminum core has a very high thermal conductivity (about 1000 W/cm K) which enables heat to be widely dispersed with a minimal temperature difference.

The support tubes are segmented, with overlapping sliding joints at their ends. This arrangement enables the tubes to readily compensate for the differential thermal contraction between the inner portion of the cable which is at 4 K, and the outer vacuum boundary insulation 40 which is at the ambient atmospheric temperature. Aluminum, for example, contracts by 0.4% when it is cooled from normal temperature (300 K) down to 4 K.

As the support tubes are cooled down, the sliding joints allow them to contract slightly, while their center positions remain longitudinally fixed relative to the outer pipe.

The tubes are designed so that they can withstand an inwards pressure that is 10 times greater than the magnetic pressure in the worst case scenario, that is, where 3 of the adjacent 7 sections levitated superconducting cables fail, and all of the current flows in the 4 remaining cables. This safety factor of 10 appears more than adequate. The corresponding weight of the graphite epoxy and aluminum tubes are 7 and 10 kilograms per meter of cable, respectively. The total weight of the support tubes is thus 17 kg per meter of cable, slightly less than the 20 kg per meter weight of the superconductor. There is also an additional weight of 20 kg per meter required by the high purity matrix in which the NbTi/Cu superconductor strands are imbedded.

The third requirement that must be satisfied is that the conductor be adequately cooled, and that any energy released by conductor motion and/or flux jumps be transported away from the conductor so that will remain in the superconducting state.

The StarTram conductor design is very conservative with regard to energy release and cooling, because:

1) the diameter of the individual NbTi filaments in the superconducting strands are very small (about 6 microns), which minimizes the probability of flux jumping, and the amount of energy release should it occur;

2) the superconducting strands are imbedded in a high purity (99.999%) high electric conductivity aluminum matrix that effectively shield them from rapidly changing magnetic fields, preventing the possibility of a triggered sequence of flux jumps;

3) the conductors are rigid and mechanically well supported, minimizing the possibility and amount of energy release from movements; and 4) the conductors are designed to be cryostable, that is, if all of the NbTi stands in the conductor transitioned to the normal state and their current switched to the high purity aluminum matrix, the heat flux resulting from $I^2R$ heating to the helium coolant is low enough that the conductor can be cooled back to the temperature at which the NbTi would regain superconductivity.

The conductors surround the outer tube 36 and are cooled by the liquid helium coolant 42, allowing the $I^2R$ and heat to be transferred from the conductors to the helium. The magnetic pressure on the conductors is very strong, i.e., on the order of 50 atmospheres radially downwards towards the support tube, holding them firmly in place. In addition, the outer insulation 40 may include an open graphite-epoxy grid on top of the conductor winding for increased strength.

The fourth requirement that must be satisfied is to have good thermal insulation 40 outside the liquid helium cooled region with its conductors and inside the platform 30 therearound, which is at the atmospheric ambient temperature. For altitudes greater than about 10 kilometers, the ambient atmospheric temperature is constant at 216 K, well below the average ambient surface temperature of about 300 K at many locations.

However, even though the average ambient temperature on the platform is lower than normal, heat leakage into the 4 K region must be minimized, in order to keep the amount and cost of refrigeration reasonable.

Heat leakage is minimized by using the multi-layer vacuum insulation 40 surrounding conductors. The multi-layer insulation 40 has a very low thermal conductivity, typically on the order of $0.5 \times 10^{-6}$ W/cm K. In addition, an intermediate temperature thermal shield is used. This intercepts a substantial fraction of the thermal leakage and removes it at a temperature of about 77 K, the normal boiling point of liquid nitrogen.

The electric energy input required to reject a unit amount of heat from a 77 K region is much less than the same unit of heat rejected from 4 K. The Carnot efficiency power for a refrigeration cycle operating between 77 K and 216 K is about 2 watts (e), per watt (th) at 77 K, compared to Carnot efficiency of about 50 watts (e) between 4 K and 216 K. The actual refrigeration power will be on the order of four times the Carnot efficiency power, due to various irreversible losses in the refrigeration cycle.

Using the intermediate thermal shield, the actual insulation heat leak between 77 K and 4 K can be reduced to ~0.02 watts (th)/m$^2$, a very small quantity, corresponding to only a few watts per kilometer of levitated cable.

The individual sky cables 24 may have any conventional configuration, but are preferably disposed inside the platform 30 in redundant loops in the preferred embodiment of the present invention. Similarly, the cooperating ground cables 26 may be conventionally constructed like the sky cables 24, and are also disposed in a corresponding platform 30 substantially identical to the one used for the sky cables, but the ground platform is suitably supported along the earth's surface.

The superconducting sky and ground cables 24,26 continuously circulate electrical current therethrough during operation for maintaining magnetic levitation forces vertically therebetween. During initial construction of the StarTram system, the sky platform 30 and the cables 24 therein may be initially constructed at ground level, and then energized with increasing amounts of electrical current for elevating the platform to its final position at altitude and retained to the ground by the tethers 28.

Various tether configurations to anchor the levitated cables 24 and launch tube 16 have been examined.

As initially shown in FIG. 1, the tethers 28 are suitably spaced apart along the entire perimeter of the sky platform 30 on both sides thereof, and suitably anchored to the earth at ground level. A plurality of primary tethers 28a extend from the ground vertically and are joined to a respective plurality of secondary tethers 28b branching upwardly therefrom. The secondary tethers 28b thusly extend downwardly from the sky platform and cables and provide restraint distributed along the perimeter thereof. The secondary tethers join their corresponding primary tethers to carry reaction forces downwardly to the earth.

FIGS. 13–16 illustrate schematically a preferred embodiment for the tethers 28 arranged in three orientations including oppositely angled tethers designated A,B and vertical tethers C therebetween.

Figure 14:
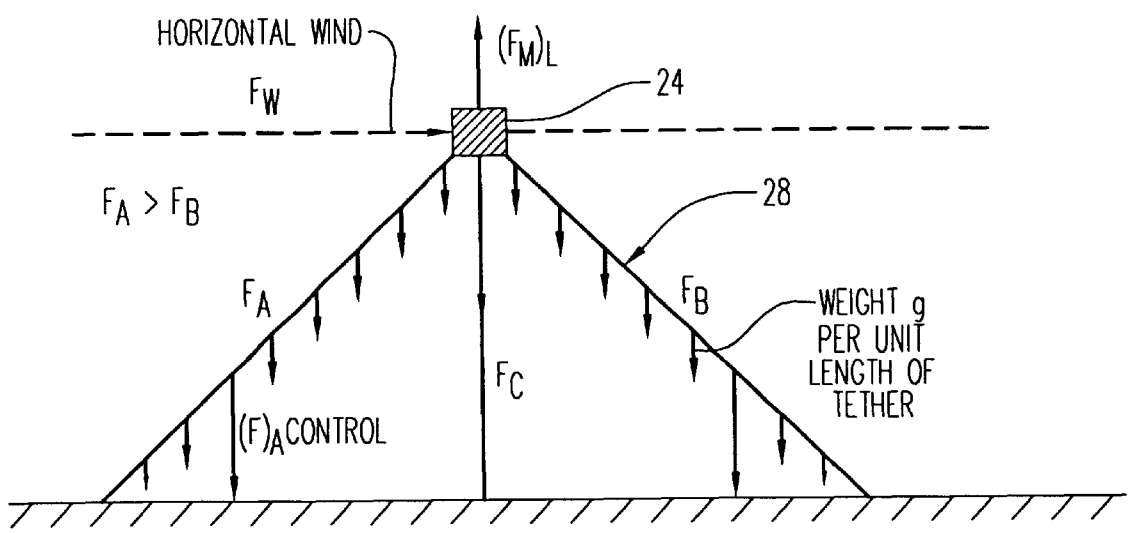
FIG. 14 is a schematic view of the tether system illustrated in FIG. 13 subject to horizontal wind force.

FIG. 14 shows a configuration where the tension force, $F_C$, in the vertical tethers C offset most of the net magnetic lift force, with the rest offset by the tension forces, $F_A$ and $F_B$, in the angled tethers (A and B) at each side. Prestressing the angled tethers increases the lateral stiffness, reducing horizontal displacements from wind forces.

The net magnetic lift force (Nim of tube) equals the total magnetic lift force minus the weight of the platform 30 and launch tube 16:

$$(F_m)_L^2 = (Fm)_L - (M_P + M_{LT})g \qquad (19)$$

The net lift force (N/m) is balanced by tension forces from the 3 tethers A, B, and C:

$$(F_m)_L^2 = F_C + \eta_O[F_A(x=0) + F_B(x=0)] \qquad (20)$$

multiplication by the factor $\eta_O$ gives the vertical components of $F_A$ and $F_B$ at the platform. The net magnetic lift force (N/m) on the system of platform, launch tube, and tethers is:

$$(Fm)_L^{**} = (Fm)_L^* - (M_A + M_B + M_C)g = (\gamma - 1)(F_m)_L \qquad (21)$$

For continued lift capability in the event that some superconducting cables degrade or fail, the net lift factor, $\gamma$, should be >1, with a desirable value in the range of about 1.2 to 1.3. The relative vertical forces carried by the angled and vertical tethers is an important factor for design. Angled tethers are heavier than vertical ones, which favors having most of the vertical force carried by the vertical tether.

However, to maximize lateral stiffness, having most of the vertical force in the angled tethers is favored. The force (N/m of tube) carried by the vertical tether C can be expressed as a fraction, $\gamma$, of the net magnetic lift force:

$$F_C = \gamma(Fm)_L^* \qquad (22)$$

The remainder of the lift force, $(1-\gamma)(Fm)_L^*$ is carried by the angled tethers A and B. The weight of tether C (N/m of tube) is given by:

$$M_C g = A_C \rho_C H_O g = \frac{F_c}{S_{O(C)}} \rho_C H_O g \qquad (23)$$

For minimum weight, the tether material should have low density, $\rho_C$, and high tensile operating stress, $S_O(C)$. A high tensile modulus is also very desirable to minimize extensibility under load. Possible tether materials include Kevlar 49 and oriented polyethylenes such as Spectra and Dynmeea. Oriented polyethylenes have low density (910 kg per m$^3$), high ultimate strength (about 3 GPa) and high tensile modulus (about 200 GPa). For this design, the tether stress is assumed to be a small fraction, only 20%, of ultimate strength, corresponding to an operating stress of 0.6 GPa (90,000 psi).

The behavior of the two angled tethers is determined from the catenary equations. The horizontal force components (N/m of tube) are constant along the tethers, and equal and opposite:

$$(F_A)_H = (F_B)_H = \frac{(1-\lambda)(Fm)_L^*}{2\sinh[\psi + \beta]} \qquad (24)$$

The tether tension forces (N/m of tube) vary as (x=lateral distance from platform):

$$F_A(x) = F_B(x) = (F_A)_H \cosh\left[\psi + \beta\left(1 - \frac{2x}{L_1}\right)\right] \qquad (25)$$

The tethers reach their ground anchors at $x = L_1 = H_O \cot\theta$. Their tension force (N/m of tube) is maximum at the platform (x=0):

$$F_A(x=0) = F_B(x=0) = (F_A)_H \cos h[\psi + \beta] \qquad (26)$$

The parameters $\beta$ and $\psi$ are given by:

$$\beta = \frac{qL_1}{2(F_A)_H}; \psi - \sinh^{-1}\left(\tan\theta\frac{\beta}{\sinh\beta}\right) \qquad (27)$$

where the weight per unit length of tether, q (N/m per meter of tube):

$$q = \frac{F_A(x=0)\rho_A g}{S_O(A)} \quad (28)$$

For this example, the angled tethers are assumed to have the same density, $\rho$, and maximum operating stress, $S_O$, as the vertical tether.

Equations (24) through (28) are solved simultaneously to yield $(F_A)_H$, $F_A$, $\beta$, $\psi$, and q. The remaining tether quantities are then calculated. The weight of the angled tether (N/m of tube) is given by the difference between the vertical forces at the two ends of the tether, i.e., at the platform (x=0) and at the surface anchor point (x=$L_1$):

$$M_A g = M_B g = \int_{X=0}^{X=L_1} q\, ds \quad (29)$$
$$= (F_A)_H \{\sinh[\psi + \beta] - \sinh[\psi - \beta]\}$$

The lineal density of stretched tethers is assumed to equal that of unstretched tethers. This slightly over-estimates the weight of the tether, by about 0.3%. The sag ratio, f, at the mid-span of the angled tethers is:

$$f = \frac{1}{2\beta}\{\cosh[\psi + \beta] - \cosh\psi\} - \frac{1}{2}\tan\theta \quad (30)$$

where the distance from the midpoint of the tether to the straight chord above (where the chord is drawn from the platform to the surface anchor) is given by $d = f L_1$.

The horizontal restoring force of the tether network is given by, assuming a horizontal displacement $\iota x = u$ to the right (FIG. 14):

$$\Delta F = K_{AB} u = [F'_A(x=L_1+u)]_H - [F'_B(x=L_1-u)]_H \quad (31)$$

where $K_{AB}$ is the stiffness constant, $F'_A$ and $F'_B$ are the perturbed tension forces in the tethers, with their horizontal components designated by the subscript H. $F'_A$ and $F'_B$ are obtained from the solution of equations (24) through (28) for the perturbed state, under the condition that the weight of the tethers in the perturbed state is the same as that in the unperturbed state.

The values of $\beta$ and $\psi$ also change in the perturbed state, and become different for the A and B tethers. The value of $K_{AB}$ is virtually constant for horizontal displacements of interest. The network displacement response to transverse wind forces is thus essentially linear.

Equations (19) through (31) fully describe the properties of the tether network, given the set of input parameters: $(Fm)_L$, $M_P$, $M_{LT}$, $\lambda$, $\rho_C$, $S_O$ (C), $\theta$, $H_O$. Parametric studies have been carried out, but because of the very large parametric space involved, an optimum design has not yet been determined. The representative design shown in Table 2 appears very practical, but it can probably be improved with additional study.

TABLE 2

StarTram Platform and Tether Parameters

| | Nominal Value |
|---|---|
| Platform and Launch Tube (30,16) | |
| Levitation Geometry | Tilted Linear Dipole Loop |
| Maximum Altitude | 22 km Above Sea Level |
| Maximum Levitation Height, H | 18 km Above Surface |
| Loop Width (Variable) | 3.6 × Local Levitation Height |
| Weight of Platform/m of Tube Length, Mpg | 1 MT/m |
| Weight of Launch Tube/m of Tube, M g | 1 MT/m @ 22 km |
| | 2 MT/m @ 10 km |
| Gross Magnetic Lift/m of Tube, $(Fm)_L$ | 4 MT/m @ 22 km |
| | 6 MT/m @ 10 km |
| Net Magnetic Lift/m of Tube, $(Fm)^{**}_L$ | 1.2 MT/m @ 22 km |
| | 2.5 MT/m @ 10 km |
| Levitation Current, $I_L$ | 14 Megamps |
| Tethers (28) | |
| Number and Type | 2 Angled Plus Vertical |
| Tether Angle | 45 Degrees |
| Material | Oriented Polyethylene (Spectra) |
| Operating Tensile Stress | $6 \times 10^8$ N/m |
| Ultimate Tensile Strength | $3 \times 10^8$ N/m |
| % Load Factor in Vertical Tether, $\lambda$ | 70% |
| Weight of Angled Tethers/m of Tube | 0.32 MT/m @ 22 km |
| Weight of Vertical Tether/m of Tube | 0.42 MT/m @ 22 km |
| Sag Ratio of Angled Tethers, Midspan | 0.0905 |
| Platform Horizontal Motion From Cross Wind | — |
| Without Active Control of Tethers | 8 m @ 50 m/sec (110 mph) |
| With Active Control of Tethers | ≦ 1 m @ 50 m/sec (110 mph) |

High winds can horizontally displace the platform and launch tube. The wind force primarily acts on the launch tube, since it has the largest projected area, $A_{LT}$ (m$^2$) For a horizontal wind of velocity $V_W$(m/sec) perpendicular to the launch tube, the wind force is (N/m of tube):

$$F_W = \tfrac{1}{2}\rho_{AIR} C_D A_{LT} V_W^2 \quad (32)$$

Figure 17:
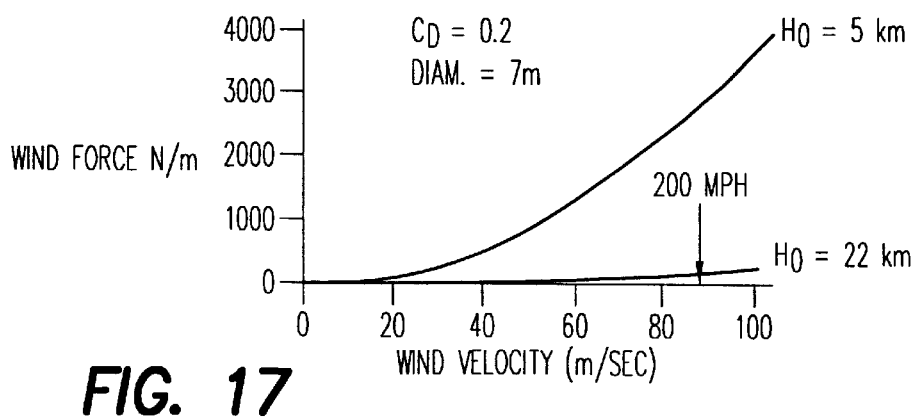
FIG. 17 is a graph of wind force versus wind velocity for the tether system restraining the sky cable.

At a speed of 50 m/sec (110 mph), the wind force is 110 N/m, based on $\rho_{AIR}$=0.0645 kg/m$^3$ (22 km altitude), drag coefficient $C_D$=0.2 and $A_{LT}$=7 m$^2$ per meter of tube as illustrated in FIG. 17. For the tether network in Table 2, this would produce a displacement of 8 m. Such displacements pose no problem for the tethers, since the changes in tensile stress are small. However, wind caused displacements may exceed that allowable for the launch tube if they occur over a short section.

A 50 km long section of tube readily accommodates large horizontal deviations (e.g., ±100 meters) since there is sufficient time for magnetic force guidance corrections to adjust the path of the 8 km/s spacecraft. However, for shorter sections, e.g., a few kilometers in length, wind forces should not make the track deviate by more than about 1 meter from its planned alignment. Deviations smaller than ±1 meter can be handled by the clearance between the spacecraft and the launch tube guidance loops, whose position can be adjusted in real time if desired.

Wind velocities of 50 m/sec are rare at 22 km altitude. Strganac ("Wind Study for High Altitude Platform Design," NASA Reference Publication 1044, 1979) gives wind speeds as a function of altitude and season at 69 locations in the Northern Hemisphere. His data indicates that high latitude locations (i.e., ≧70° N) generally have similar wind patterns.

Averaging four of these locations gives mean wind speeds at 22 km altitude that range from a low of about 6 m/s during the summer season (June, July, August) to about 12 m/s in the spring (March, April, May) and fall (September, October, November) seasons, going up to about 22 m/s in the winter season (December, January, February). Wind speeds at the 95th percentile (i.e., 95% of winds have speeds below the gusted value) are 13 m/s in the spring and fall, and 48 m/s in the winter.

These wind patterns apply to a StarTram site located in Greenland. Other sites, such as the south polar plateau (85° S) and the Australian outback (25° S), would have lower wind speeds. Since winds will usually strike the StarTram track obliquely and not at 90°, the actual wind force will be substantially less than given by equation (32).

The above wind statistics indicate that a StarTram site could operate over 95% of the year with allowable displacements using a passive tether network. With an active control system to limit tether movement, the site could operate 100% of the year.

Figure 13:
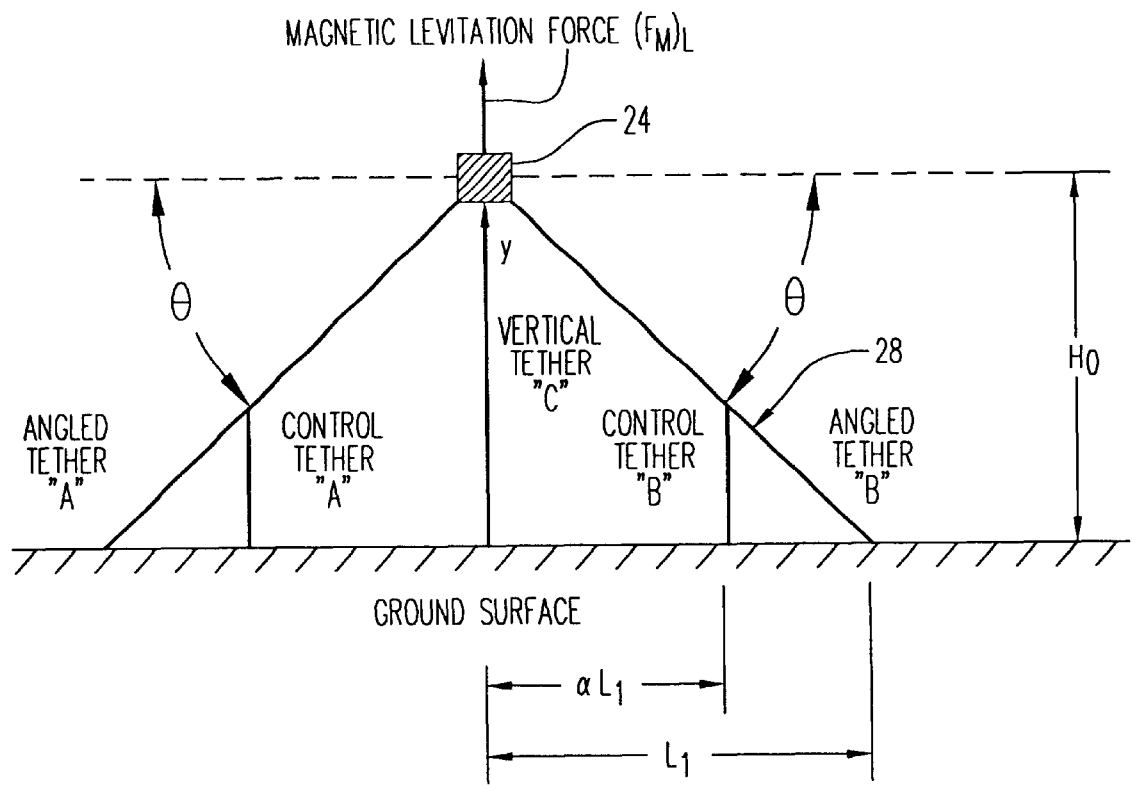
FIG. 13 is a schematic elevational view of an exemplary embodiment of tethers restraining the sky cable illustrated in FIG. 1.

FIG. 13 shows a simple approach to actively limit displacement. If the wind force is to the right, pulling down on control tether A counteracts it, preventing horizontal displacement of the platform. If the wind is to the left, control tether B is pulled down. The magnitude P of the control force (N/m of tube) is determined for a catenary of mid span sag ratio f with point loading at $x=\alpha L_1$:

$$P = \left[\frac{8f}{3\alpha(1-\alpha)}\right]F_W \tag{33}$$

For typical values of $\alpha$ about 0.8 and f about 0.09, P is about 1.5 $F_W$, or about 160 Newtons per meter of tube for a wind speed of 50 m/sec (110 mph). The control tethers are only about 3 km in length.

A second approach is to have small currents in the tethers interact with the magnetic field of the SC ground cables. The resultant forces can be upwards or downwards, depending on the direction of the control currents. The control force is about 100 Newtons per amp, when integrated over the length of the tether. With small, lightweight (about 1% of tether weight) aluminum conductors, the tether could quickly respond to all wind forces, including the most extreme. This control approach requires that the tracks of the A and B tethers be oriented to have a directional component that lies parallel to the launch tube track.

Figure 15:
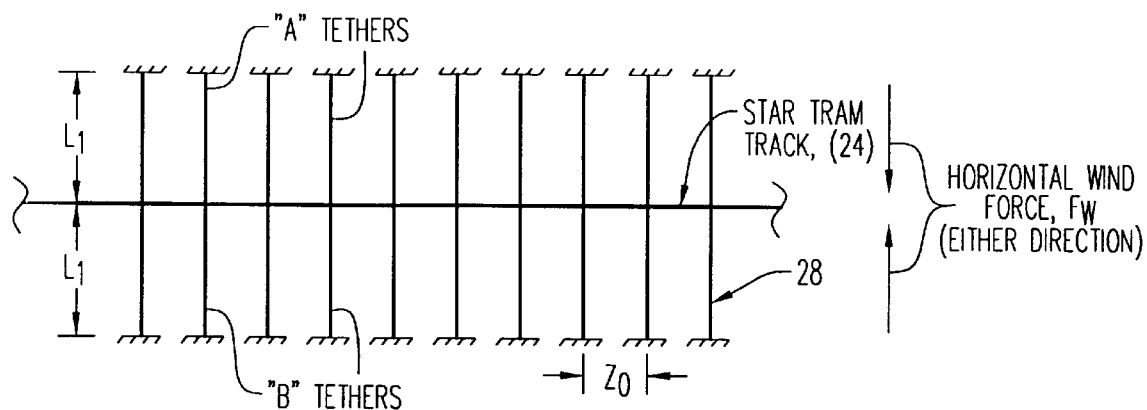
FIG. 15 is a plan view of a portion of the tether system illustrated in FIG. 13.
Figure 16:
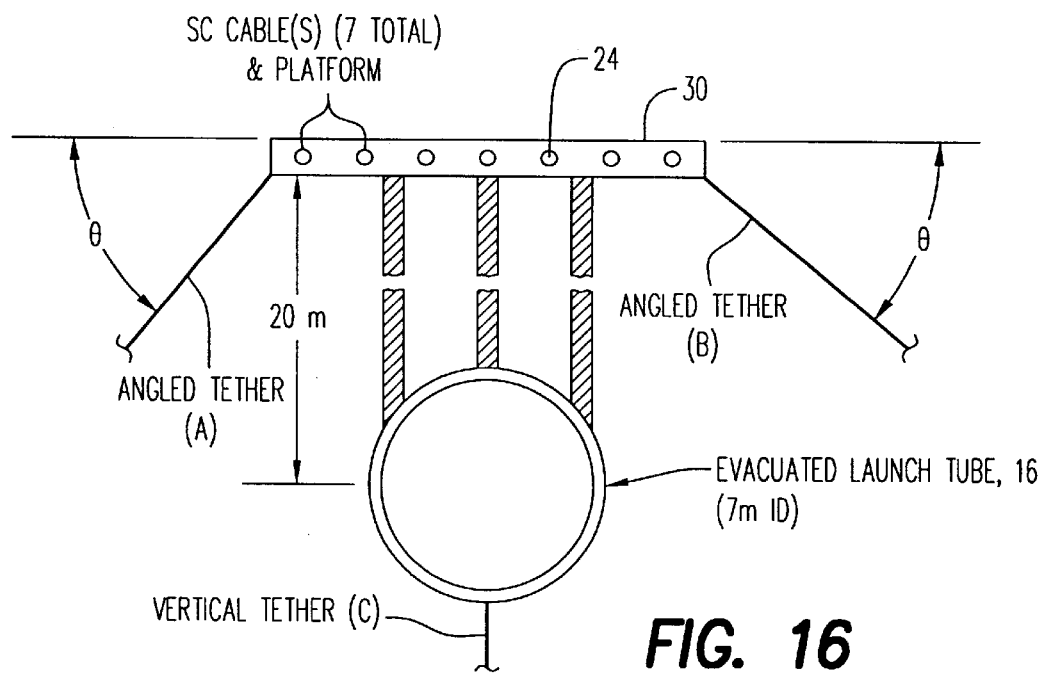
FIG. 16 is an elevational sectional view of the tether system illustrated in FIG. 13 restraining a plurality of sky cables within a supporting platform from which extends the sky tube as additionally illustrated in FIG. 1.

The StarTram tether network illustrated in FIG. 15 includes tethers spaced at intervals of 1 to 2 kilometers (km) along the tube. In practice, the primary tethers 28a illustrated in FIG. 1 transition to a web of small secondary tethers 28b that attach to the platform and launch tube at about 50 meter intervals. The transition points are located about 1 km below the launch tube 16.

The secondary tethers 28b preferably overlap, so that if a primary tether failed, the structure would continue to be anchored by the secondary tethers still connected to other primary tethers. This arrangement distributes wind loads more uniformly, and minimizes horizontal displacements of the launch tube for locations between the primary tethers.

Additional stiffening is provided by strong longitudinal tension forces carried either in the platform/launch tube structure itself, or in separate cables attached to the structure. A modest weight of Kevlar or polyethylene tension cable, e.g., 5% of the platform/launch tube weight, would carry a tension force of on the order of $5\times10^7$ newtons, which would prevent local wind gusts from causing excessive displacements.

As the spacecraft moves along the curved launch tube 16, the brief impulse (about $10^{-2}$ sec) of centripetal force ($F_S=M_S\ a_S/L_S$) causes a slight vertical displacement of the tube—upwards or downwards, depending on the direction of curvature:

$$(\delta y)_{LT} = \frac{1}{2}\left(\frac{M_S a_S}{L_S}\right)(M_{LT}+M_P)^{-1}\left(\frac{2L_S}{V_S}\right)^2 m \tag{34}$$

For a spacecraft mass ($M_S$) of 200 MT, velocity ($V_S$) of 8000 m/s, and length ($L_S$) of 30 m, centripetal acceleration ($a_S$) of 25 m/sec$^2$, and $M_{LT}=M_P=1$ MT/m, the value of $(\delta y)_{LT}$ is only 2 millimeters. The corresponding mechanical energy imported to the tube is about 400 J/m, resulting in small vertical oscillations of the tethers and launch tube. These are rapidly dissipated by active and passive dampers in the tether network. The oscillations only occur after the spacecraft has passed, because their propagation velocity along the track is much smaller than the velocity of the spacecraft.

The launch tube/tether system has a very low horizontal oscillation frequency, about 0.01 Hz; moreover, it responds very sluggishly to wind forces. At 22 km altitude, for example, a 50 m/s (110 mph) wind gust takes over 6 seconds to move the launch tube by 1 meter. This sluggish response lets the tether system time average varying wind forces, and makes it easier to control launch tube position.

However, since there will be a delay of about 30 seconds between the time control forces applied at ground level can affect a platform at 22 km, an anticipatory control approach appears necessary. Knowledge of the strength, direction, and duration of incoming winds, gained by laser doppler radar or other methods, will help determine were and when control forces should be applied.

Time varying wind forces can potentially induce oscillations in the tether network. However, their magnitude should be very small, because of the system's low natural frequency and its strong damping capability, with active control of the tethers and/or passive damping by magnetic or hydraulic dash pots.

The StarTram tether system is designed to be ultra reliable, redundant, and fail-safe. Tether operating stress is low, about 20% of ultimate strength. The platform and launch tube are tied to the many over-lapping, independent, and redundant secondary tethers, which in turn are attached to primary tethers. Similar multi-strand fail-safe space tethers have been proposed for use in space. If individual load bearing strands in the primary tethers fail, their loads transfer to neighboring strands through secondary strands. Such tethers can continue to operate, even if many local failures occur. Finally, adjacent primary tethers will take over the load even if a primary tether were to completely fail.

The spacecraft 12 illustrated in FIG. 1 may be suitably configured for being propelled through the sky tube 16 for launch into outer space, with the capability for returning to earth for reuse.

Figure 18:
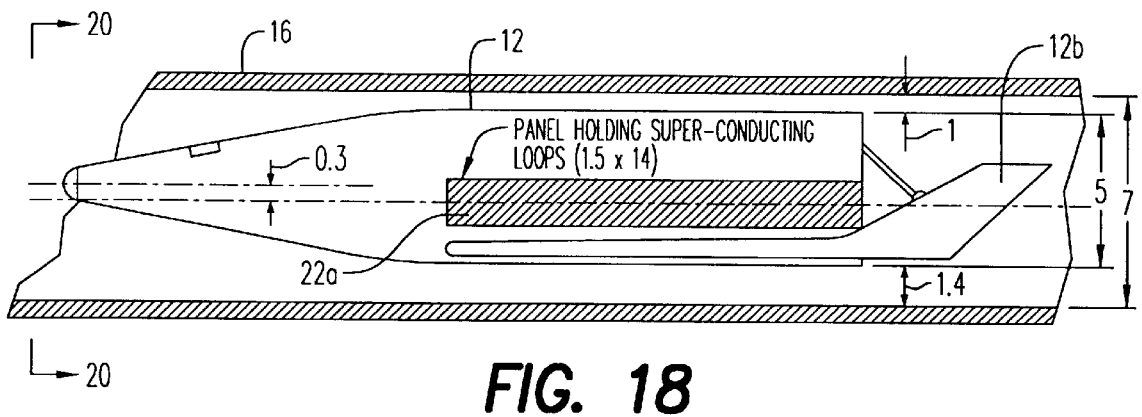
FIG. 18 is a side elevational view of an exemplary form of the spacecraft illustrated in FIG. 1 within the sky tube.
Figure 19:
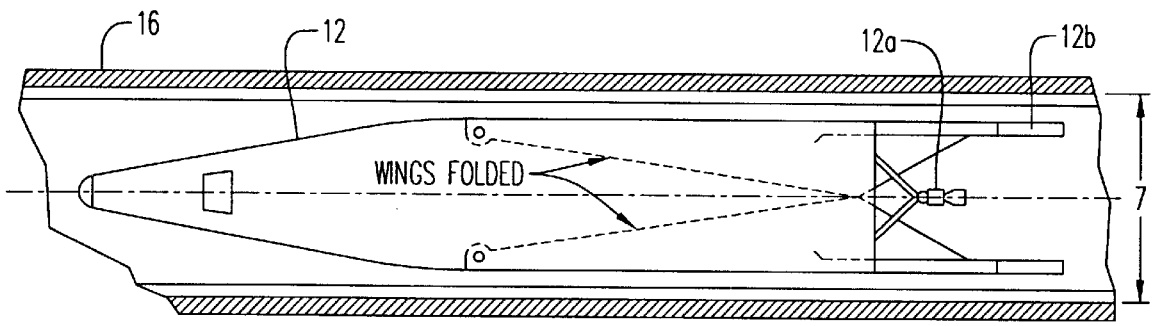
FIG. 19 is a top view of the spacecraft within the sky tube illustrated in FIG. 18.
Figure 20:
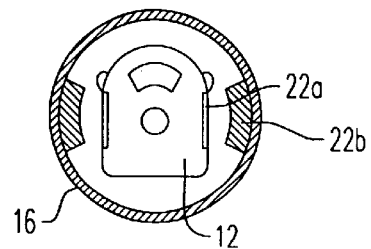
FIG. 20 is an elevational sectional view of the sky tube illustrated in FIG. 18 and taken along line 20—20 showing the spacecraft magnetically suspended therein.

FIGS. 18–20 illustrate one form of the spacecraft 12 sized for being launched through the sky tube 16, with dimensions therein being meters. The spacecraft may have a suitable configuration, like the present space shuttle used by the United States for sending payloads into space by rocket propulsion. The spacecraft illustrated in FIGS. 18 and 19 has rockets 12a for effecting final insertion propulsion as required. The spacecraft also includes a pair of wings 12b which are initially folded in a stowed position for minimizing the cross section of the spacecraft within the sky tube.

Figure 21:
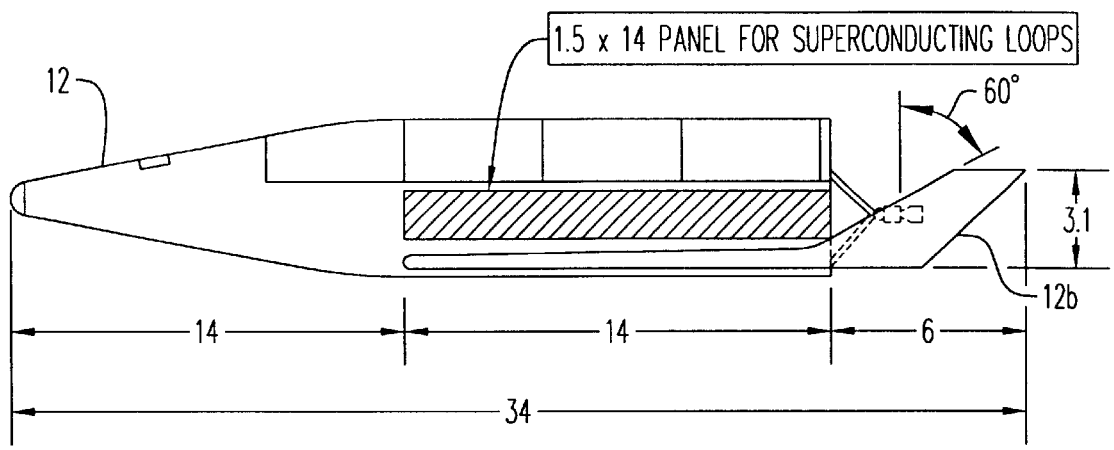
FIG. 21 is a side elevational view of the spacecraft after launch from the sky tube with wings deployed for return to earth.
Figure 22:
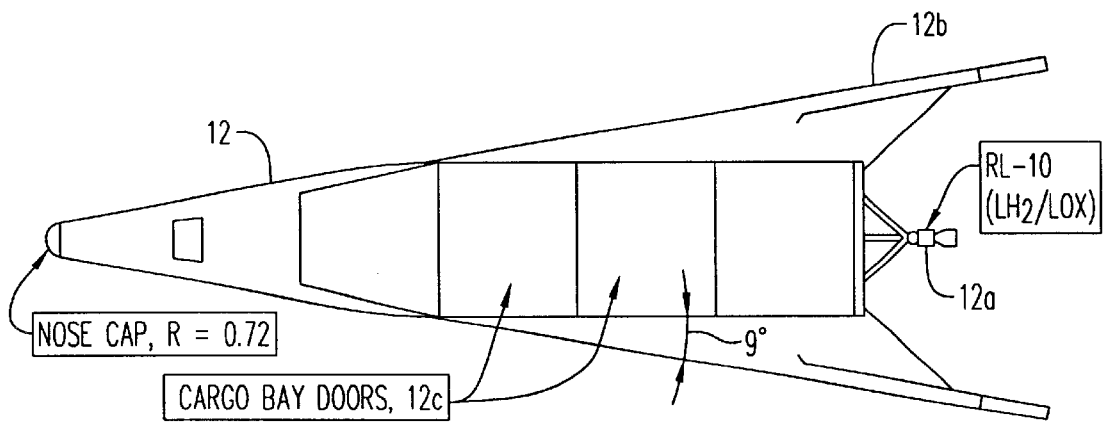
FIG. 22 is a top view of the spacecraft illustrated in FIG. 21 with wings deployed.
Figure 23:
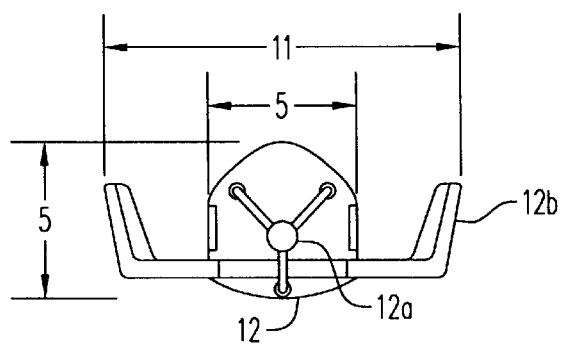
FIG. 23 is a back elevational view of the spacecraft illustrated in FIGS. 21 and 22 with wings deployed.

The wings 12b are deployed in space as illustrated in FIGS. 21–23, wherein dimensions indicated are in meters.

The wings 12b are suitably deployed for permitting the spacecraft to return to earth by gliding through the atmosphere.

The spacecraft illustrated in FIGS. 18–23 may be configured for manned or unmanned operation, and may include a cargo bay with doors 12c for carrying payloads into earth orbit.

The StarTram system described above is relatively simple conceptually and may be manufactured using conventional technology for substantially reducing the cost of launching payloads into earth orbit. The maglev propulsion system utilizes earth-based electrical energy for accelerating the spacecraft to escape velocity initially inside the acceleration tunnel for subsequent coasting through the sky tube for launch from the outlet thereof. The spacecraft, including its payload, is thusly efficiency propelled through the sky tube to high altitude wherein it escapes earth's gravity for achieving earth orbit. The StarTram system may be constructed in various embodiments and located at different sites around the earth for providing low cost access to earth orbit.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A method for launching a spacecraft from earth into outer space comprising:

magnetically suspending a sky tube having an inlet on earth and an outlet at altitude;

evacuating air from said sky tube; and propelling said spacecraft through said sky tube and out said outlet to achieve escape velocity to reach said outer space.

2. A method according to claim 1 wherein said sky tube extends horizontally from the surface of earth at said inlet, and is inclined from the curvature of earth toward said outlet.

3. A method according to claim 2 wherein said spacecraft is propelled through said sky tube by:

accelerating said spacecraft into said sky tube on earth; and then coasting said spacecraft through said sky tube for launch from said outlet.

4. A method according to claim 3 wherein said spacecraft is magnetically levitated and accelerated on earth and into said sky tube.

5. A method according to claim 3 further comprising rocket propelling said spacecraft upon discharge from said sky tube to achieve earth orbit.

6. A method according to claim 3 further comprising:

generating magnetic up force in a superconducting sky cable fixedly attached to said sky tube from earth to said outlet;

generating magnetic down force in a superconducting ground cable extending along earth and below said sky cable in magnetic repulsion therewith; and tethering said sky cable to earth in magnetic alignment with said ground cable to magnetically suspend said sky cable and attached sky tube above earth.

7. A space tram for launching a spacecraft from earth into outer space comprising:

a sky tube having an inlet on earth and an outlet at an opposite end;

means for magnetically suspending said sky tube for positioning said outlet thereof at altitude;

means for evacuating air from said sky tube; and means for propelling said spacecraft through said sky tube and out said outlet to achieve escape velocity to reach said outer space.

8. A space tram according to claim 7 wherein said sky tube extends horizontally from the surface of earth at said inlet, and is inclined from the curvature of earth toward said outlet.

9. A space tram according to claim 8 wherein:

said propelling means are effective for accelerating said spacecraft into said sky tube on earth; and said sky tube is evacuated to permit said accelerated spacecraft to coast therethrough upwardly from earth for launch from said outlet.

10. A space tram according to claim 9 wherein said propelling means are effective for magnetically levitating and accelerating said spacecraft into said sky tube on earth.

11. A space tram according to claim 9 wherein said sky tube suspending means comprise:

a superconducting sky cable fixedly attached to said sky tube from earth to said outlet, for generating a magnetic up force;

a superconducting ground cable extending along earth below said sky cable for generating a magnetic down force in magnetic repulsion therewith; and a plurality of tethers for tethering said sky cable to earth in magnetic alignment with said ground cable to magnetically suspend said sky cable and attached sky tube above earth.

12. A space tram according to claim 11 wherein said sky cable and ground cable are each in the form of a dipole loop, and said sky tube is suspended below a portion of said sky cable loop.

13. A space tram according to claim 12 wherein said sky and ground cable loops have teardrop configurations with two legs diverging from proximal ends on earth to distal ends at said altitude, and said sky tube is suspended below one of said sky cable legs.

14. A space tram according to claim 13 further comprising a pair of said sky tubes suspended from corresponding ones of said sky cable legs.

15. A space tram according to claim 12 further comprising a platform including a plurality of said sky cables integrally formed therein in a common loop, and said sky tube is suspended from said sky platform.

16. A space tram according to claim 15 wherein said sky platform has a rectangular cross section, and said plurality of sky cables are laterally aligned coplanar therein.

17. A space tram according to claim 12 wherein said tethers comprise:

a plurality of secondary tethers extending downwardly from said sky cable; and a plurality of primary tethers each joined to a respective plurality of said secondary tethers, and extending downwardly to earth, and fixedly mounted thereto.

18. A space tram according to claim 12 wherein said sky tube has a variable curvature trajectory between its inlet and outlet, and initially curves upward from said inlet to a transition point at intermediate altitude, and then curves downward to said outlet.

19. A space tram according to claim 12 wherein said propelling means comprise:

an acceleration tunnel joined to said sky tube inlet;

said spacecraft includes superconducting magnets; and said acceleration tunnel includes superconducting magnetic rails magnetically cooperating with said spacecraft magnets for levitating said spacecraft and accelerating said spacecraft through said tunnel for propulsion through said sky tube joined thereto.

\* \* \* \* \*